United States Patent
Zing et al.

(10) Patent No.: US 8,618,752 B2
(45) Date of Patent: Dec. 31, 2013

(54) SYSTEM, ARCHITECTURE, AND METHOD FOR MINIMIZING POWER CONSUMPTION AND INCREASING PERFORMANCE IN ELECTRIC VEHICLES

(75) Inventors: Christopher P. Zing, Milpitas, CA (US); Joachim H. Wiest, Pleasanton, CA (US); Henry T. Fung, San Jose, CA (US)

(73) Assignee: Superior Electron, LLC, Grosse Pointe, MI (US)

( * ) Notice: Subject to any disclaimer, the term of this patent is extended or adjusted under 35 U.S.C. 154(b) by 340 days.

(21) Appl. No.: 13/187,150

(22) Filed: Jul. 20, 2011

(65) Prior Publication Data

US 2012/0019172 A1    Jan. 26, 2012

Related U.S. Application Data

(60) Provisional application No. 61/366,252, filed on Jul. 21, 2010.

(51) Int. Cl.
*H02P 5/46* (2006.01)

(52) U.S. Cl.
USPC ............ 318/8; 318/7; 318/13; 475/5; 701/22; 180/65.22

(58) Field of Classification Search
USPC ........... 318/8, 13, 430, 432, 7; 475/5; 701/22; 180/65.22
See application file for complete search history.

(56) References Cited

U.S. PATENT DOCUMENTS

| | | | |
|---|---|---|---|
| 4,354,144 A * | 10/1982 | McCarthy | ...................... 318/13 |
| 5,343,970 A | 9/1994 | Severinsky | |
| 5,365,431 A | 11/1994 | Minezawa et al. | |
| 5,396,968 A | 3/1995 | Hasebe et al. | |
| 5,419,406 A | 5/1995 | Kawamoto et al. | |
| 5,729,100 A * | 3/1998 | Rothstein et al. | ................. 318/7 |

(Continued)

FOREIGN PATENT DOCUMENTS

| CN | 101513829 A | 8/2009 |
|---|---|---|
| WO | 2010051427 A2 | 5/2010 |

OTHER PUBLICATIONS

Miller, Hybrid Electric Vehicle Propulsion System Architectures of the e-CVT Type, IEEE Transactions on Power Electronics, vol. 21, No. 3, May 2006.

(Continued)

*Primary Examiner* — Paul Ip
(74) *Attorney, Agent, or Firm* — Dykema Gossett PLLC

(57) ABSTRACT

An electric vehicle accomplishes speed changes through the use of electronically controlled, multiple electric motor configurations that are coupled to an output drive shaft instead of a speed change transmission. A parallel-coupled motor configuration includes at least two motors that are each coupled to the output drive shaft through respective gear arrangements, each gear arrangement having a respective gear ratio. In a serially-coupled motor configuration, the stator of the second motor is coupled to the rotor of the first motor, where the rotor of the second motor is coupled to the output drive shaft. The required torque to reach or maintain a desired vehicle speed can be obtained by selective energization of either one or both of the motors (in both multi-motor configurations). Two motors are also coupled to a differential gear so that the rotational speed contributed by both motors are additive at the output shaft.

23 Claims, 9 Drawing Sheets

(56) References Cited

U.S. PATENT DOCUMENTS

| | | |
|---|---|---|
| 7,066,854 B2 | 6/2006 | Duan |
| 7,112,155 B2 | 9/2006 | Keuth |
| 7,208,894 B1 | 4/2007 | Earle |
| 7,693,637 B2 * | 4/2010 | Mensler et al. .............. 701/55 |
| 8,016,061 B2 * | 9/2011 | Jeon et al. .............. 180/65.22 |
| 8,226,515 B2 * | 7/2012 | Phillips .............................. 475/5 |
| 8,398,514 B2 * | 3/2013 | Phillips .............................. 475/5 |
| 8,452,472 B2 * | 5/2013 | Ogura .............................. 701/22 |
| 8,453,770 B2 * | 6/2013 | Tang .............................. 180/65.1 |
| 8,511,407 B2 * | 8/2013 | Jeon et al. .............. 180/65.265 |
| 2002/0170757 A1 | 11/2002 | Kitada et al. |
| 2004/0198551 A1 * | 10/2004 | Joe et al. .............................. 477/3 |
| 2005/0023053 A1 | 2/2005 | Bennett |
| 2005/0247503 A1 * | 11/2005 | Imazu .............................. 180/300 |
| 2005/0262827 A1 | 12/2005 | Ichimoto et al. |
| 2006/0009884 A1 * | 1/2006 | Mensler et al. .............. 701/1 |
| 2006/0016627 A1 | 1/2006 | Robertson |
| 2006/0250902 A1 | 11/2006 | Bender et al. |
| 2008/0119315 A1 * | 5/2008 | Lawson .............................. 475/6 |
| 2009/0223726 A1 * | 9/2009 | Jeon et al. .............. 180/65.25 |
| 2009/0236160 A1 * | 9/2009 | Tanaka et al. .............. 180/65.265 |
| 2009/0242293 A1 * | 10/2009 | Tanaka et al. .............. 180/65.285 |
| 2010/0222953 A1 * | 9/2010 | Tang .............................. 701/22 |
| 2011/0053724 A1 * | 3/2011 | Phillips .............................. 475/5 |
| 2011/0086737 A1 * | 4/2011 | Phillips .............................. 475/5 |
| 2011/0130234 A1 * | 6/2011 | Phillips .............................. 475/5 |
| 2011/0130235 A1 * | 6/2011 | Phillips .............................. 475/5 |
| 2011/0137501 A1 * | 6/2011 | Lee .............................. 701/22 |
| 2011/0230291 A1 * | 9/2011 | Phillips .............................. 475/5 |
| 2012/0035796 A1 * | 2/2012 | Jeon et al. .............................. 701/22 |
| 2012/0196713 A1 * | 8/2012 | He et al. .............................. 475/5 |
| 2012/0196721 A1 * | 8/2012 | He et al. .............................. 477/3 |
| 2012/0197472 A1 * | 8/2012 | He et al. .............................. 701/22 |

OTHER PUBLICATIONS

Xue et al., Selection of Electric Motor Drives for Electric Vehicles, Department of Electrical Engineering, the Hong Kong Polytechnic University, Hung Hom, Kowloon, Hong Kong, China.

* cited by examiner

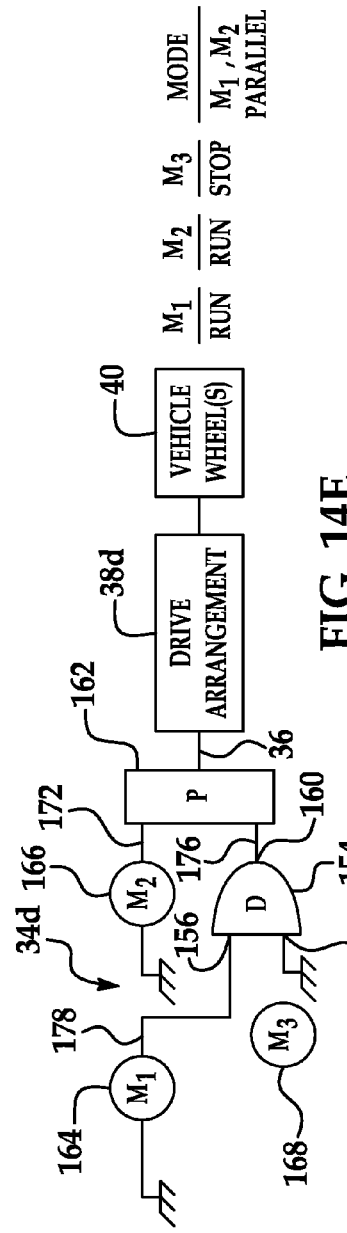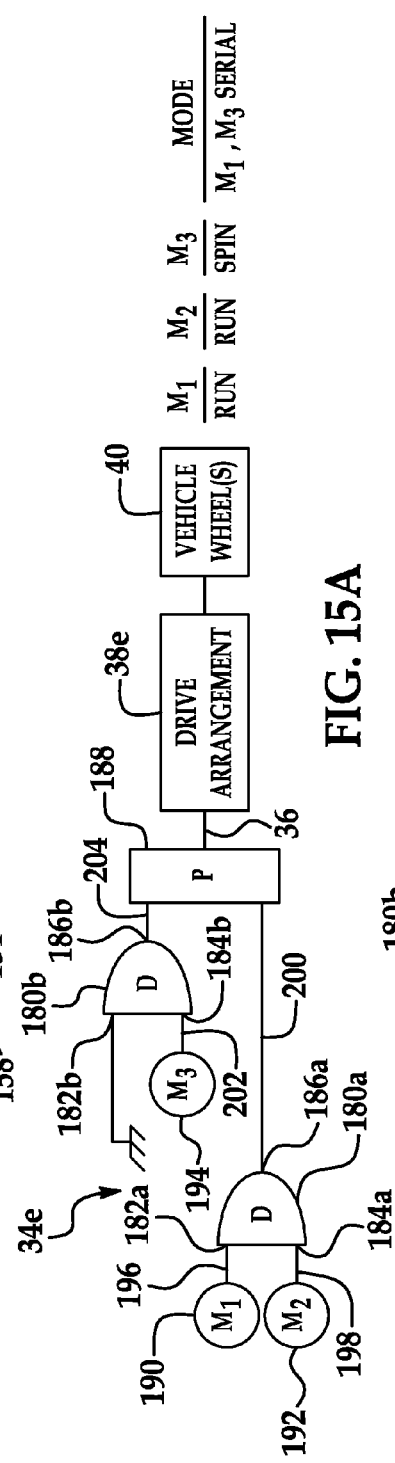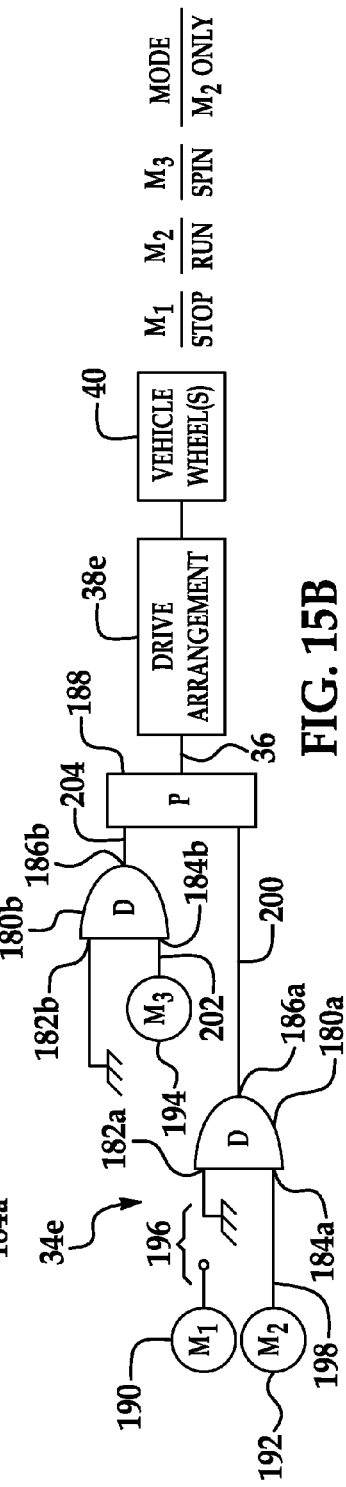

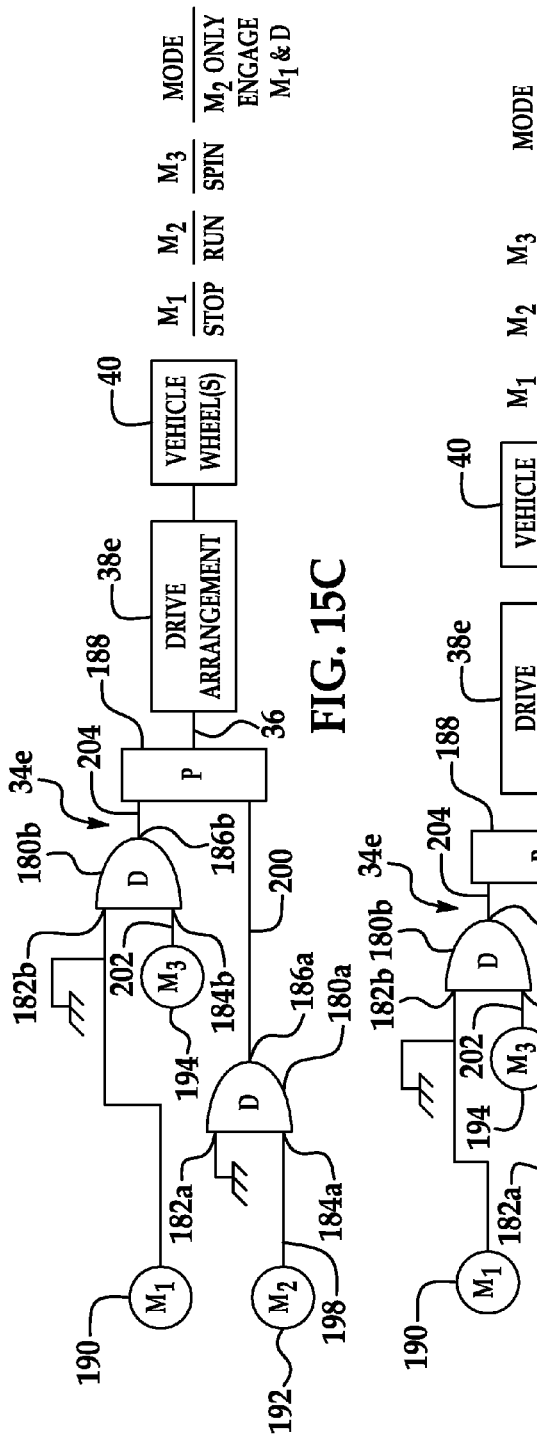

SYSTEM, ARCHITECTURE, AND METHOD FOR MINIMIZING POWER CONSUMPTION AND INCREASING PERFORMANCE IN ELECTRIC VEHICLES

CROSS-REFERENCE TO RELATED APPLICATIONS

This application claims the benefit of U.S. Provisional Patent Application Ser. No. 61/366,252 filed Jul. 21, 2010, and hereby incorporated by reference in its entirety.

BACKGROUND OF THE INVENTION a. Field of the Invention

The instant disclosure relates generally to propulsion mechanisms for an electric car, and more particularly to multiple electric motor-based mechanisms.

b. Background Art

It is known to use electric motors in electric or hybrid-electric vehicles. For example, it is known to use DC electric motors and/or AC electric induction motors in electric vehicle applications. However, there is desire to improve the efficiency of operation. With regard to the electric motor energization itself, various control schemes have been developed that improve efficiency of that aspect. For example, AC induction motor control approaches, such as variable frequency drive (VFD) technology, have improved efficiency. However, there remains fundamental inefficiency in the current electrical drive train architecture. The basic problems will be described below, in connection with FIGS. 16-17, which illustrate typical electric motor torque and power curves.

As shown in FIG. 16, the developed torque declines as the motor speed increases, such that the available torque at high motor speeds is relatively limited. As a consequence, as shown in FIG. 17, the available power also becomes relatively limited as the motor speed increases. Since the useful range of torque over speed (i.e., RPM) is limited, if an electric motor is directly coupled to a drive shaft without transmission, the vehicle will have a limited top speed and has limited torque and horsepower at such high speed. The typical solution to this problem is to incorporate a transmission between the motor and the drive shaft. The transmission allows (i.e., through a gear ratio selection) a desirable motor RPM range, a range at which the motor can produce adequate torque and horsepower (and at a desired efficiency), can be associated with the desired vehicle speed.

One practical problem is that a transmission (e.g., automatic transmission) is difficult to design to match the special torque curve of an electric motor. Also, a transmission adds weight, cost, and efficiency loss to the vehicle and/or drive train. Moreover, the transmission has its own unique failure modes, which potentially affects reliability.

Conventional electric car drive train architecture is inherited from that used in internal combustion (IC) engine powered vehicle designs, namely, an architecture including one engine paired with one transmission. While hybrid electric vehicles add a supplementary source of power (i.e., both IC engine and electric motor), a transmission is still used to match the optimum RPM range of both power sources to a desired vehicle speed. Even with the use of emerging motor control approaches, such as VFD motor technology, electrical motors are nonetheless relatively inefficient at both low and high speed (RPM) and are also relatively inefficient at low power output levels. These limitations reduce the overall energy efficiency of an electric vehicle, which in turn reduces the effective driving range of such an electrical vehicle (per charge).

There is a need for an improved mechanical drive train architecture for an electrical vehicle that minimizes or eliminates one or more of the problems set forth above.

BRIEF SUMMARY OF THE INVENTION

A drive system for an electric vehicle accomplishes speed changes through the use of electronically controlled, multiple electric motor configurations that are coupled to an output drive shaft, instead of a speed change transmission. Advantages of the embodiments include improved performance and efficiency.

In one parallel-coupled, multiple-motor embodiment, first and second electric motors having respective first and second output shafts are coupled to an output drive shaft through respective gear arrangements. Each gear arrangement has its own gear ratio. The output drive shaft is configured for connection to a drive arrangement for driving at least one vehicle wheel. The drive system further includes an electronic control unit (ECU) and a computer-readable memory coupled thereto. Control logic, which may comprise software, may be stored in the memory and be configured for execution by the ECU. The control logic is configured to control the first and second motors in accordance with a predetermined operating strategy. One such strategy involves operation of the motors in first, second and third modes of operation. In the first mode of operation, the first motor is active while the second motor is inactive. In the second mode, both motors are active. In the third mode of operation, the first motor is inactive and the second motor is active. Through the foregoing, both torque and power are improved across a broader speed range, as compared to single motor configurations. In addition, efficiency can be improved through selective energization of the motors or through various other approaches described hereinafter.

In a serially-coupled, multi-motor embodiment, the drive system for a vehicle includes a first electric motor having first stator and rotor portions and a second electric motor having second stator and rotor portions. The second stator portion is coupled to the first rotor portion and the second rotor portion is coupled to an output drive shaft, which in turn is configured for connection to a drive arrangement for driving at least one vehicle wheel. The drive system further includes an electronic control unit (ECU) and a computer-readable memory coupled thereto. In addition, control logic, which may comprise software, may be stored in the memory and be configured for execution by the ECU. The control logic is configured to control the first and second motors in accordance with a predetermined operating strategy. One strategy includes at least a first and a second mode of operation. In the first mode of operation, the first motor is inactive while the second motor is active. In the second mode, both motors are active. In the second mode, the rotational speed of the output shaft corresponds to the sum of the individual rotational speeds of the two motors.

In a further embodiment, the first and second motors are coupled to the output drive shaft through a differential gear.

These and other benefits, features, and capabilities are provided according to the structures, systems, and methods depicted, described and claimed herein.

BRIEF DESCRIPTION OF THE DRAWINGS

FIGS. 14A-14E are diagrammatic and block diagram views of an exemplary embodiment of an electric motor arrangement depicting the conversion of the electric motor arrangement from a serially-coupled configuration to a parallel-coupled configuration.

FIGS. 15A-15F are diagrammatic and block diagram views of another exemplary embodiment of an electric motor arrangement depicting the conversion of the electric motor arrangement from a serially-coupled configuration to a parallel-coupled configuration.

DETAILED DESCRIPTION OF THE INVENTION

Figure 1:
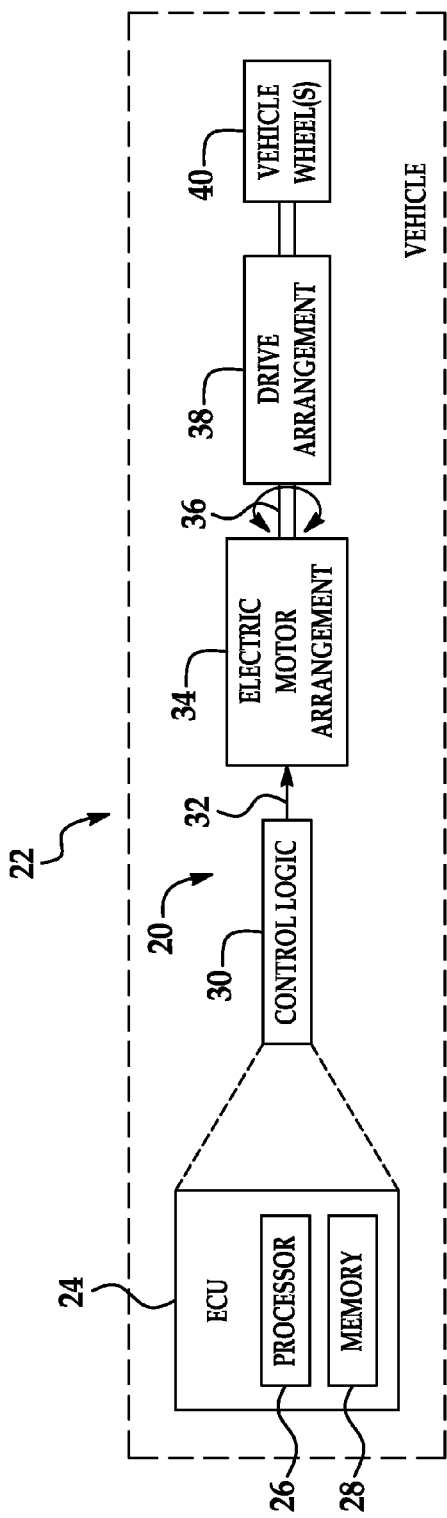
FIG. 1 is a block diagram view of a system including an improved driveline for an electric vehicle.

Referring now to the drawings wherein like reference numerals are used to identify identical components in the various views, FIG. 1 is a block diagram view of a drive system 20 configured for use in an improved driveline of an electric vehicle 22. FIG. 1 further shows an electronic control unit (ECU) 24, which may include a processor 26 and a memory 28, control logic 30 configured to produce one or more output control signal(s) 32, an electric motor arrangement 34 having an output drive shaft 36, a drive arrangement 38 and one or more vehicle wheel(s) 40.

The ECU 24 is configured through control logic 30 to perform a plurality of functions described in greater detail below, which involve controlling the operation of the electric motor arrangement 34. It should be understood that while ECU 24 is shown as a single block, actual implementation may involve multiple ECU's and/or multiple processing cores, either co-located and/or distributed in location. ECU 24 may comprise conventional components known to those of ordinary skill in the art. In an embodiment, ECU 24 may comprise a general programmable unit and wherein control logic 30 may comprise software.

Control logic 30 is configured to produce one or more control signal(s) 32, which, when supplied to electric motor arrangement 34, is operative to control the operation thereof, including movement of drive shaft 36.

The electric motor arrangement 34 is responsive to the control signal(s) 32 and is configured in the several embodiments described herein to efficiently rotate output drive shaft 36. Electric motor arrangement 34 includes a plurality of electric motors mechanically coupled to each other in different ways. In common, however, is the elimination of the conventional speed change transmission. In lieu of the transmission, which adds weight, cost and contributes to inefficiency, the drive system 20 includes control logic 30 that is configured to accomplish "gear selection" by selective energization of one or more of the electric motors included within arrangement 34. The drive system 20 is useful in a wide variety of applications, including automotive vehicle applications such as electric-powered vehicle applications, fuel cell vehicle applications or plug-in hybrid electric vehicles.

Several embodiments are disclosed below and include (1) a parallel-coupled embodiment wherein multiple electric motors are mechanically coupled in parallel to output shaft 36, (2) a serially-coupled embodiment wherein multiple motors are mechanically coupled in series to each other and where the collective output is provided to or as output shaft 36; and (3) an electric motor arrangement using a differential gear.

In the parallel-coupled embodiment, the distributed, multiple motors are disposed in a parallel (mechanical) arrangement. Gear selection is achieved by electrically energizing certain ones of the motors in accordance with a predetermined control strategy or scheme. In an exemplary embodiment, this parallel arrangement eliminates the need for a transmission because multiple motors with different RPM ranges and or different gear ratios drive the drive shaft 36.

In the serially-coupled embodiment, two or more motors are, in-effect, mechanically daisy-chained together (i.e., serially) to add horsepower. As opposed to the parallel embodiment, in the serial embodiment, the motors mechanically-coupled in series are operative to contribute significant torque across all operating speeds (RPM).

In the differential embodiment, which is a particular implementation of the serially-coupled motor arrangement, two or more electric motors combine to power output drive shaft 36, where the speed (RPM) of the drive shaft is the addition of the speed of each of the contributing motors.

With continued reference to FIG. 1, drive arrangement 38 may comprise conventional drive arrangements known in the art to interface between a drive shaft and one or more drive wheel(s) 40. For example, drive arrangement 38 may comprise a differential gear (not shown in FIG. 1) whose two wheel outputs are respectively coupled to a pair of wheels 40. It should be understood that variations are possible, and yet remain within the scope and spirit of the present invention.

Figure 2:
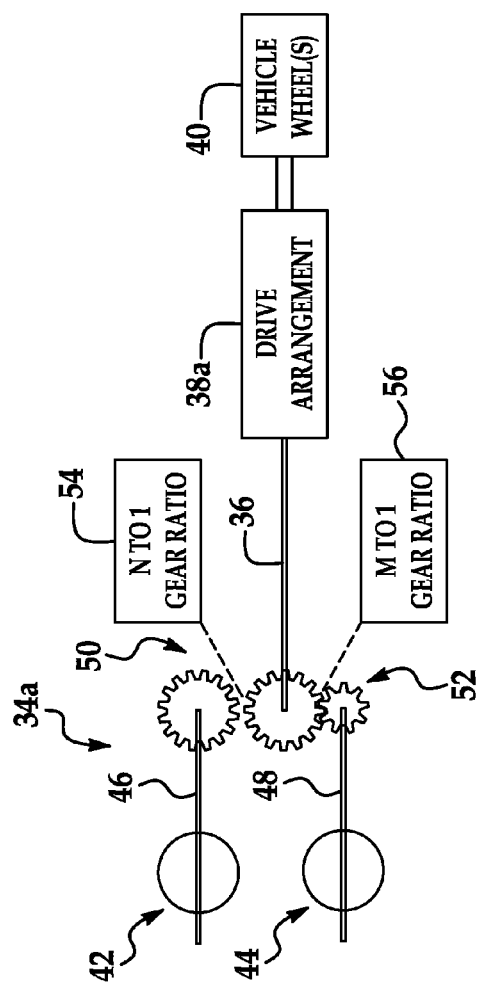
FIG. 2 is a diagrammatic and block diagram view of a first, parallel-coupled embodiment of the driveline of FIG. 1.

FIG. 2 is a diagrammatic and block diagram view of a first, parallel-coupled embodiment of the driveline of FIG. 1, designated electric motor arrangement 34a. Arrangement 34a includes a first and second electric motors 42 and 44 having respective first and second output shafts 46 and 48 both coupled to output drive shaft 36 through respective first and second gear arrangements 50 and 52. The first and second gear arrangements 50 and 52, in turn, have respective first and second gear ratios 54 and 56 associated therewith. The foregoing defines a parallel motor architecture. As further shown in FIG. 2, the drive shaft 36 is configured to be coupled to a drive arrangement 38a, which may be any conventional drive arrangement known in the art suitable for driving wheels 40. For example, for an automotive vehicle application, the drive arrangement 38a may comprise a differential gear. Electric motors 42 and 44 may comprise conventional motors known in the art, such as AC induction motors. Although not shown, motor drive circuitry blocks would also be included, responsive to control signals 32 produced by control logic 30.

In the illustrated embodiment, the first gear ratio is designated N to 1 while the second gear ratio is designated M to 1. In an embodiment, the gear ratios 54, 56 are different, although in certain other embodiments, the gear ratios may be the same, with the electric motors 42, 44 having different operating characteristics. As noted above, in an embodiment, the electric motors 42, 44 are coupled to drive shaft 36 with different gear ratios 54, 56. Accordingly, the rotors (not shown) of both motors 42, 44 turn when any one of the motors 42, 44 turns. Each motor 42, 44 will be energized for a particular RPM range that will drive the vehicle 22 in a specific speed range (i.e., each motor has a different RPM range and switching between motors 42, 44 allows for switching between RPM ranges). When one of the motors 42, 44 is energized, however, the other one of the motor(s) 42, 44 may remain de-energized.

For example, when motor 42 is energized and turns at a speed of N RPM, the rotor of motor 44, which may remain de-energized, nonetheless remains coupled to the shaft and thus turns at a speed of M RPM. In this use-case, the rotational momentum presented by motor 44 acts as and otherwise performs the function of a conventional flywheel with respect to the drive train (i.e., output drive shaft 36). That is, the momentum of motor 44 may act to dampen speed fluctuations of shaft 36 (and thus the drive train as a whole). Conversely, when motor 44 is energized and turns at M RPM, the rotor of motor 42 is not energized and turns at N RPM. The rotational momentum of the rotor of motor 42 acts as a flywheel to the drive train.

Figure 3:
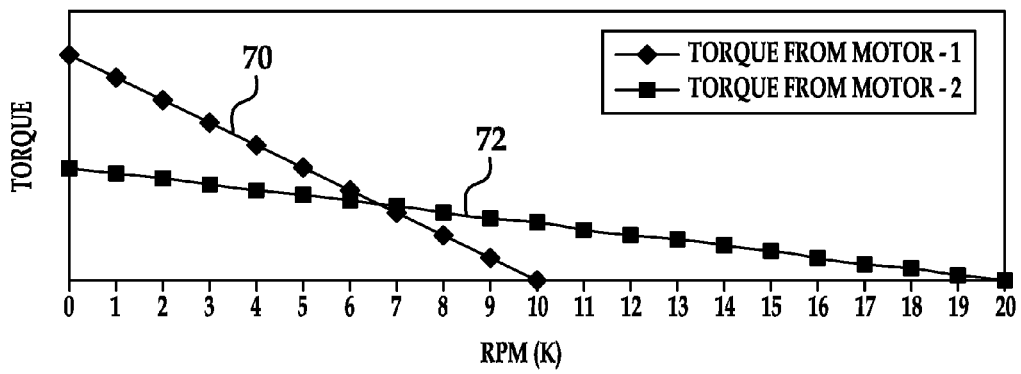
FIG. 3 is a torque versus speed chart reflecting the operation of the parallel embodiment of FIG. 2.

FIG. 3 is a torque versus speed chart showing the operation of a parallel-coupled embodiment. The torque curves 70, 72 reflect the motors 42, 44 of FIG. 2 each being configured to have a similar output torque curve (i.e., torque versus speed profiles) but where motor 44 is configured with a 2-to-1 gear ratio advantage over motor 42. Under this scenario, first torque curve 70 covers a first speed range (i.e., approximately 0-10,000 RPM), but a second torque curve 72 associated with motor 44 extends out to a higher maximum RPM (i.e., 20,000 RPM) and covers an extended RPM range as well (i.e., 0-20,000 RPM). In the higher RPM range, motor 42 is not operating. The condition of motor 44 operating alone is equal to a single motor configuration driving the drive shaft through a transmission.

Figure 4:
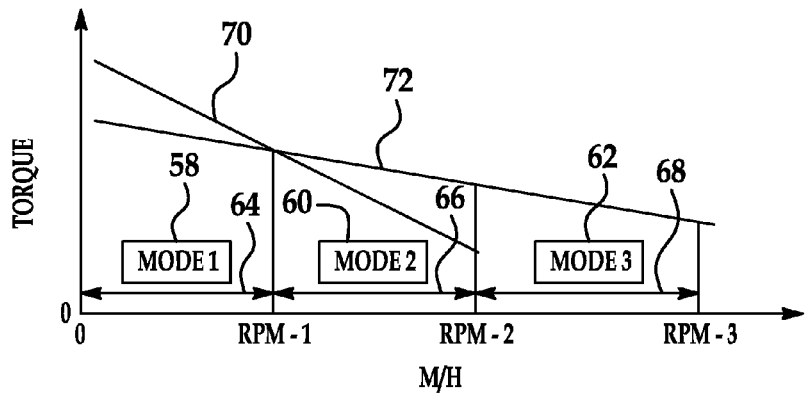
FIG. 4 is a torque versus speed chart showing multiple modes of operation of the parallel embodiment of FIG. 2.

FIG. 4 is a torque versus speed chart showing multiple modes of operation over the entire RPM range for the parallel-coupled embodiment of FIG. 2. Control logic 30, in this illustrated embodiment, is configured to implement a predetermined operating strategy that specifies the control of the operation of the electric motor arrangement 34a in a first mode of operation 58, a second mode of operation 60 and a third mode of operation 62.

In the first mode of operation 58, motor 42 is active (i.e., energized) while motor 44 is inactive (i.e., de-energized, acting as a flywheel). As shown, the x-axis indicates speed, which may be taken to correspond to the rotational speed of output drive shaft 36. The first mode 58 corresponds to a first condition where the rotational speed of shaft 36 is within a first speed interval 64. In FIG. 4, the first speed interval 64 extends from approximately zero (0) RPM to a first transition speed, designated RPM-1. It should be understood that the rotational speed of the shaft 36 corresponds to the vehicle speed. In other words, when a desired vehicle speed dictates a shaft speed between zero (0) and RPM-1, then the control logic 30 will select operation in the first mode 58.

Likewise, in the second mode of operation 60, both motors 42 and 44 are active (i.e., energized). The second mode 60 corresponds to a second condition where the rotational speed of shaft 36 is within a second speed interval 66. In FIG. 4, the second speed interval 66 extends approximately from the first transition speed RPM-1 to a second transition speed, designated RPM-2, which is greater than the first transition speed RPM-1. Thus, when a desired vehicle speed dictates a shaft speed between RPM-1 and RPM-2, then the control logic 30 will select operation in the second mode 60.

Finally, in the third mode of operation 62, motor 44 is active (i.e., energized) while motor 42 is inactive (i.e., de-energized, acting as a flywheel). The third mode 62 corresponds to a third condition where the rotational speed of shaft 36 is within a third speed interval 68. In FIG. 4, the third speed interval 68 extends approximately from the second transition speed RPM-2 to a third transition speed, designated RPM-3 that is greater than the second transition speed RPM-2. Thus, when a desired vehicle speed dictates a shaft speed between RPM-2 and RPM-3, then the control logic 30 will select operation in the third mode 62. Because the gear ratios associated with each motor 42, 44 are different, each motor 42, 44 operates in its desired RPM range (i.e., characterized by a desired torque and power output) without requiring a speed change transmission.

Thus, the drive system of the instant disclosure eliminates the need for a transmission, by substituting selective energization of one or more of at least a pair of electric motors (parallel configuration) mechanically coupled to the drive shaft. The operating strategy thus involves selectively energizing the motors either one at a time or simultaneously, depending on the circumstances, so that the motors are operated in their respective "sweet spots" to thereby improve performance.

Figure 5:
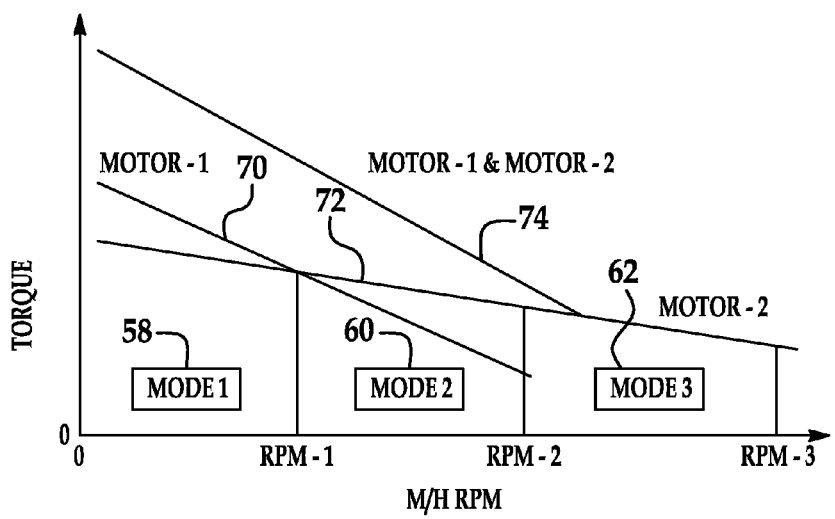
FIG. 5 is a torque versus speed chart of FIG. 4 modified to include the combined torque of both motors.

FIG. 5 is a torque versus speed chart showing the combined torque of both motors. For illustration purposes only, both motors 42, 44 are operated from between about zero (0) RPM to about RPM-2 RPM (i.e., modes 58 and 60 in this example). For simultaneous operation, the output torque versus speed, which is shown by torque curve 74, corresponds to the sum of the individual output torque from both motors 42, 44.

Figure 6:
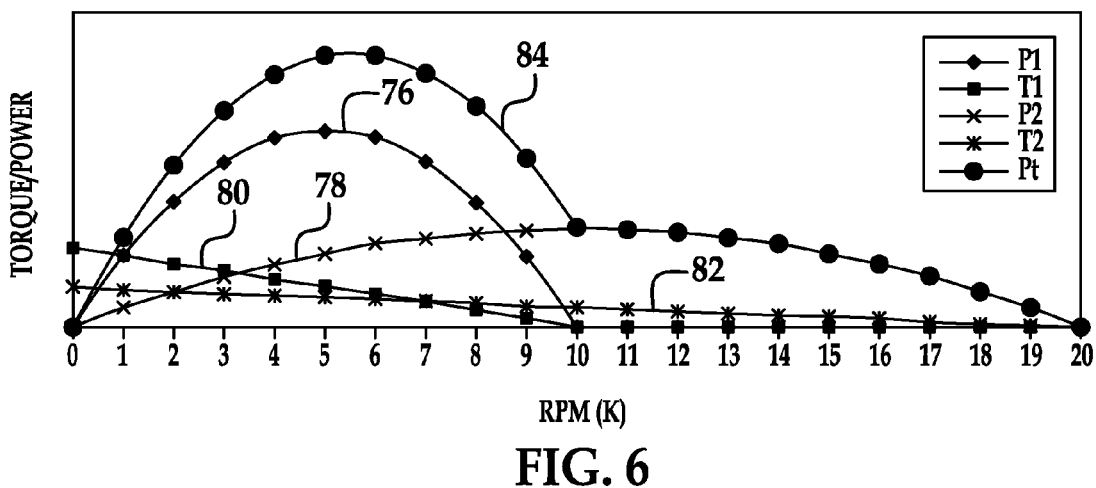
FIG. 6 is a combined torque and power versus speed chart reflecting the operation of the parallel embodiment of FIG. 2.

FIG. 6 is a chart showing torque and power (separately) versus speed for a two motor, parallel-coupled embodiment (i.e., as shown in FIG. 2). The power of motor 42 is shown as trace 76. The power of motor 44 is shown as trace 78. The torque of motor 42 is shown as trace 80. The torque of motor 44 is shown as trace 82. The combined, total power of both motors 42, 44 is shown as trace 84.

Figure 17:
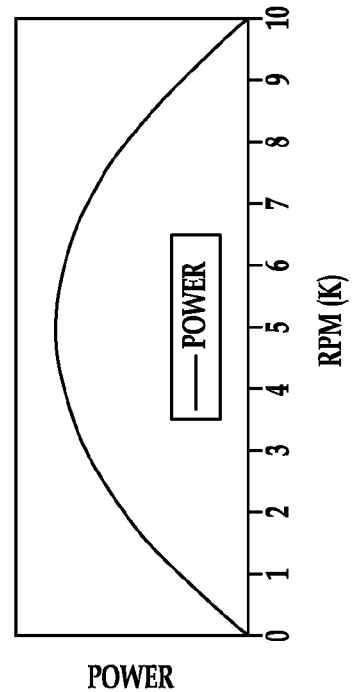
FIGS. 16 and 17 are torque and power versus speed charts, respectively, reflecting the operation of a conventional electric motor.
Figure 16:
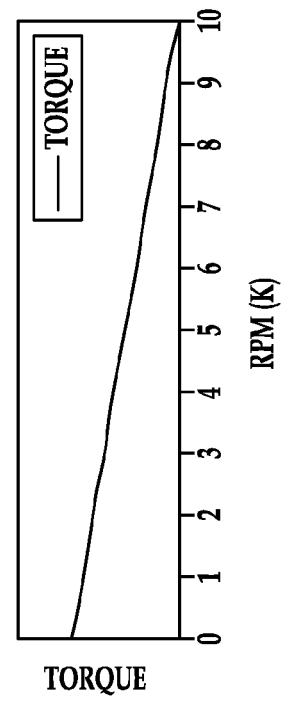

In operation, in those speed intervals where control logic 30 activates both motors 42, 44, the total power output (i.e., trace 84) corresponds to the sum of the individual power output from each motor 42, 44. There are a number of additional observations. First, assuming that in a higher speed range (i.e., 10 k to 20 k RPM in FIG. 6) that control logic 30 discontinues operation of motor 42, then the resulting output of the configuration would be identical to that of single electric motor combined with a transmission. Second, the parallel-coupled configuration, without a transmission, does deliver more power in the higher speed range (i.e., 10 k to 20 k RPM in FIG. 6), when compared to a single motor without transmission configuration (e.g., see FIGS. 16-17), where the only (single) motor in the system must be configured also for low speed operation. The parallel-coupled configuration also delivers more power and torque in the lower speed range (e.g., 0-10,000 RPM) when both motors 42, 44 operate, which represents performance improvements compared to a single motor with transmission configuration. Finally, in the higher speed range (i.e., 10 k to 20 k RPM in FIG. 6), motor 42 does not contribute to the power curve (i.e., because it is not energized).

Figure 7:
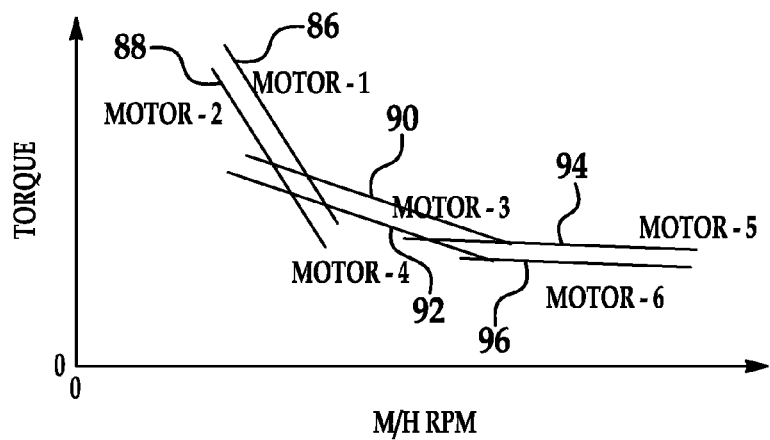
FIG. 7 is a torque versus speed chart showing the operation of the parallel embodiment of FIG. 2 as further supplemented with one-to-one redundant, secondary electric motors substantially servicing the speed ranges serviced by the primary electric motors.
Figure 8:
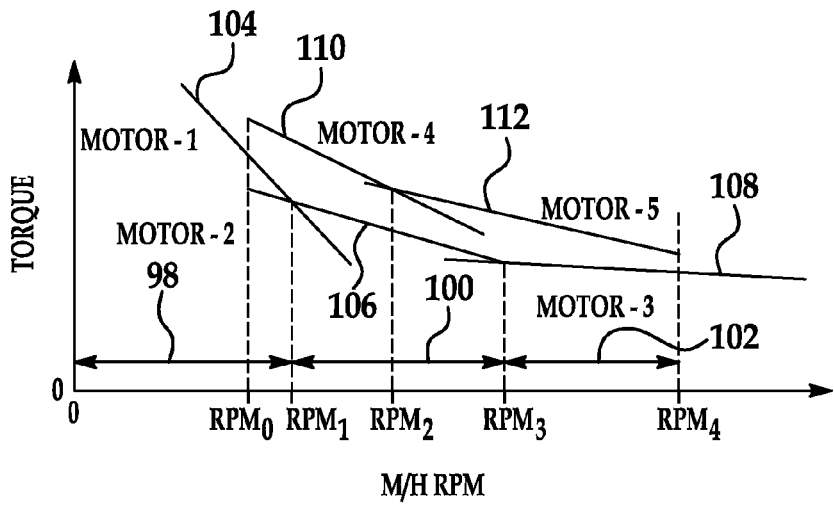
FIG. 8 is a torque versus speed chart showing the operation of the parallel embodiment of FIG. 2 as further supplemented with many-to-one redundant, secondary electric motors where one redundant motor services or overlaps the speed ranges serviced two or more primary motors.

FIG. 7 is a torque versus speed chart showing the operation of the parallel embodiment of FIG. 2 as supplemented with one-to-one redundant, secondary electric motors, while FIG. 8 shows one-to-many staggered electric motor operation. As set forth above, multiple electric motors can be mechanically-coupled (in parallel) to a single drive shaft 36. As illustrated in FIGS. 7-8, supplemental electric motors that are energized to operate in overlapping speed ranges with the primary electric motors can be configured to provide redundancy as well as for improving reliability. For example, when one motor is operating, the redundant motors are dissipating heat (i.e., cooling down). A distributed motor architecture without a transmission, as set forth herein, provides overall improved performance, reliability as well as cost-to-performance ratio.

The drive system corresponding to FIG. 7 includes six (6) motors that are mechanically-coupled to a single drive shaft 36. Motor-1 and Motor-2 operate in the same speed (RPM) range, and the respective torque-versus-speed curves are designated 86 and 88. These two motors each function as a redundant backup motor to the other. Similarly, Motor-3 and Motor-4 also operate in the same speed (RPM) range, and the respective torque-versus-speed curves are designated 90 and 92. These two motors function as a redundant backup motor to the other. Likewise, Motor-5 and Motor-6 operate in the same speed (RPM) range and the respective torque-versus-speed curves are designated 94 and 96. These two motors function as redundant backup motors to the other.

In this configuration, the primary motors (i.e., motor-1, motor-3, and motor-5) are coupled to the drive shaft 36 with respective gear arrangements having respective gear ratios, as described above. The secondary (or redundant) motors (i.e., motor-2, motor-4, and motor-6, respectively) are also directly (mechanically) coupled to the drive shaft 36 through a respective gear arrangement, but such gear arrangements match the gear ratio of the corresponding primary motor (i.e., motor-1 and motor-2 are coupled to shaft 36 with gear arrangements having substantially the same gear ratios). FIG. 7 shows a slight offset between the respective torque curves, but this is primarily for clarity in isolating the contribution of each motor/gear arrangement combination.

The control logic 30 is configured to activate or de-activate one or more of the redundant motors in accordance with a predetermined strategy. The strategy may include activating one or more of the redundant motors in one or more of the modes of operation described above. For example only, both the primary motor and the redundant motor can be activated (energized) simultaneously when the ECU 24 (control logic 30) determines that additional (i.e., burst) power is required. As a further example, however, the ECU 24 (control logic 30) can de-activate one of the primary or redundant motors when the vehicle 22 is cruising, and thus only one motor for a speed interval is needed to sustain the cruising speed. More generally, the redundant motor can be activated when the primary motor is de-activated (i.e., deliberately by the control logic 30, for example, to allow cooling) or when the primary motor is otherwise inoperable. The converse is also true.

FIG. 8 shows a redundant motor configuration that is not one-to-one but is rather one-to-many. Each redundant motor can be configured to operate in a staggered fashion so as to cover overlapping speed (RPM) ranges of the primary motors. In this one-to-many arrangement, each redundant or secondary motor is configured to provide redundancy for at least two primary motors. This configuration can offer cost reduction compared to a one-to-one redundancy scheme, while providing sufficient redundancy as well as standby burst power, as described above.

For purposes of description, the overall speed range contains a number of transition speed thresholds designated $RPM_0$, $RPM_1$, $RPM_2$, $RPM_3$ and $RPM_4$, and which is broken down into three speed intervals: a first speed interval 98 (between zero (0) RPM and $RPM_1$); a second speed interval 100 (between $RPM_1$ and $RPM_3$); and a third speed interval 102 (between $RPM_3$ and $RPM_4$). FIG. 8 shows three primary motors, designated motor-1, motor-2 and motor-3, having respective torque-versus-speed curves designated 104, 106 and 108. Likewise, FIG. 8 also shows two redundant motors, designated motor-4 and motor 5, having respective torque-versus-speed curves designated 110 and 112. The number of redundant motors is less than the number of primary motors.

The control logic 30 is configured to operate the redundant motors (or at least one of them) so as to operate in a speed interval that overlaps the speed intervals of two or more primary motors. For example, control logic 30 can be configured to control motor-4 to operate from about $RPM_0$ to $RPM_2$, thereby overlapping speed interval 98, associated with primary motor-1, and speed interval 100, associated with primary motor-2. Likewise, control logic 30 can be configured to control motor-5 to operate from about $RPM_2$ to $RPM_4$, thereby overlapping speed interval 100, associated with primary motor-2, and speed interval 102, associated with primary motor-3.

Variations are contemplated. For example, a supplementary motor configuration, similar to the redundant motor configuration described above in connection with FIG. 7, may be used where one type of motor is used for the primary (driving) motor while a second type of motor can be used for the secondary (redundant) motor.

For example, in an embodiment, the primary motor comprises an AC induction motor, which has certain characteristics desirable for operation as the main, driving motor. For example, an AC induction motor is more suitable for use in continuous load applications, although it is relatively more expensive and relatively heavier for its output power. In such an embodiment, a second type of motor, for example a permanent magnet DC (PMDC) motor can be used as the secondary (redundant) motor, as it is relatively lower in cost and weight/unit power, compared to the AC induction motor, and is thus optimized for providing intermittent (or even periodic) bursts of powers. For example, such additional power may be desirable during vehicle acceleration. In sum, while first and second motor types (which are different) may be configured, mechanically, in parallel, the resultant configuration provides needed standby torque, all at an overall lower cost, size and weight. Motor characteristics than can distinguish one type of motor from another therefore include weight, size, rated load handling level, continuous versus intermittent load handling, operating efficiency rating (electrical), a torque and/or power output versus speed, a torque or power output versus speed as a function of the motor weight, as well as other characteristics known to those of ordinary skill in the art.

While conventional drive systems include one engine and one transmission (with a plurality of gears), a parallel-coupled architecture as described above can eliminate the size, weight, cost, complexity and reliability implications of a transmission. Specifically, it should be understood that a speed change transmission is a relatively difficult component to design in the context of an electric car. The above-described parallel motor configuration, even where multiple electric motors are used, can still be cheaper than having a transmission. In addition, it should be understood that in the parallel motor configuration described herein, a de-energized motor does not have to be disconnected from the output drive shaft. In particular, the rotor of the de-energized motor (or motors) can function as a conventional flywheel, where its rotational momentum may be used to reduce rotational speed fluctuations (which is required in most applications, such as vehicle applications). In addition, the parallel coupled motors define a powertrain architecture wherein drive shaft speed changes are effected by selective energization/de-energization of one or more of the distributed motors, rather than through the use of a transmission. In effect, the parallel motor architecture defines a drive train with multiple "engines" and each with one gear.

Additionally, the selection of particular motor(s) to energize/de-energize can be accomplished through, for example, software logic (i.e., control logic 30) in combination with electrical switching (i.e., motor control). This combination provides improved flexibility, compared to, for example, hydraulic and/or mechanical approaches. Further, the coupling is accomplished through a magnetic field, thereby reducing components subject to wear and tear.

Figure 9:
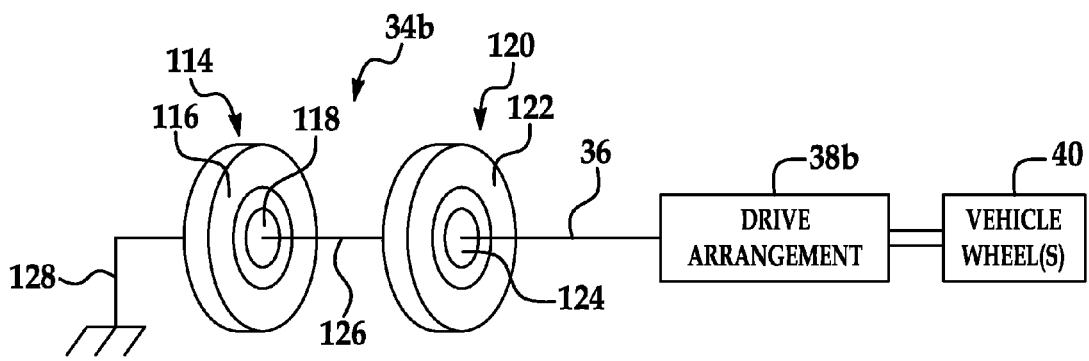
FIG. 9 is a diagrammatic and block diagram view of second, serial-coupled embodiment of the driveline of FIG. 1.

FIG. 9 is a diagrammatic and block diagram view of a second, serially-coupled motor embodiment of the electric motor arrangement of FIG. 1, designated 34b. In this embodiment, two or more motors can be "daisy-chained" together to add horsepower output in a linear fashion, as described below. This approach allows all motors in the series arrangement to contribute across the entire speed band (RPM). This is in contrast to the parallel-coupled motor embodiments, where only selected motors operate in specified RPM ranges. The trade-off between the two approaches involves mechanical complexity versus improved performance.

As shown in FIG. 9, arrangement 34b includes a first electric motor 114 having first stator and rotor portions 116 and 118, respectively, a second electric motor 120 having second stator and rotor portions 122 and 124, respectively, and output drive shaft 36 (as already described above). In the illustrative embodiment, the second stator portion 122 is coupled (i.e., mechanically) via a mechanical coupling member 126 to the first rotor portion 118 of motor 114. This connection 126 may be deployed in-line (i.e., axially), such as by attaching the stator body 122 to a shaft (not shown), which is an extension of the first rotor 118. It should be understood that variations are possible (e.g., co-axial arrangements). Accordingly, the stator 122 of motor 120 will rotate at the same speed (RPM) as the rotor 118 of motor 114. The extension 126 can be replaced with a gear to modify RPM.

The second rotor portion 124 is mechanically coupled to the drive shaft 36, which is configured for connection to drive arrangement 38b for driving at least one wheel (vehicle wheels shown at 40). Although the first stator 116 is shown as mechanically "grounded" (e.g., fixed to a vehicle frame or the like), it should be understood that the invention is not so limited, and additional stages may be added in a like manner as described and illustrated, and as generalized in equation (1) below (assuming Motor-1's stator is fixed or "grounded"):

$$\text{Rotor Speed of Motor-}n = \text{RPM-1} + \text{RPM-2} + \ldots + \text{RPM-}n \quad (1)$$

where Motor-1 develops RPM-1 (rotor relative to its stator), Motor-2 develops RPM-2 (again, rotor relative to its stator), and so on.

Control logic 30 (best shown in FIG. 1) is configured with a predetermined operating strategy for controlling electric motor arrangement 34b. As above, the control logic 30, which may comprise software, can be stored in memory 28 for execution by the ECU 24 (i.e., processor 26). The control logic 30 produces suitable control signals 32 destined to control the operation (i.e., to control the manner of energization and de-energization) of electric motor arrangement 34b. In operation, assume that motor 114 is energized to rotate at a speed of RPM-1. Since the stator 116 is mechanically restrained or grounded, the rotor 118 will turn at the speed of RPM-1 (when taken with reference "ground"). Further assume that motor 120 is likewise energized, but to a rotational speed of RPM-2. The rotor 124 will turn at a relative speed of RPM-2 with respect to stator 122. Since the stator 122 is turning at the speed of RPM-1 by virtue of the mechanical connecting member 126, the (output) rotor 124 will turn at a speed which is the combination of both motors 114, 120, namely, at a rotational speed of substantially (RPM-1+RPM-2) as referenced to "ground". In addition, the torque delivered at the output of motor 120 is substantially the same as the torque delivered at the output of motor 114, provided that the mass (i.e., rotational inertia) of motor 120 is not considered. Overall, serially-coupled motor embodiments (such as in FIG. 9) allow higher torque output to be delivered at a higher rotational speed (i.e., RPM-1+RPM-2), which exceeds the maximum rotational speed that a single motor configuration can provide. Thus, even without a transmission, the serially-coupled motor drive train embodiments have the torque and power output capability to drive a vehicle to relatively high maximum speed.

Similar to the parallel-coupled motor embodiments, the predetermined strategy for operating the serially-coupled motor embodiments may include at least first, second and third modes operation. In the first mode of operation, the second motor 120 is active and the first motor is inactive. In the second mode of operation, both the first and second motors 114, 120 are active. In the third mode of operation, the first motor 114 is active while the second motor is inactive. Of course, both motors can be inactive (fourth mode of operation).

It warrants emphasizing that the control logic 30, in accordance with its predetermined operating strategy, would energize each of the first and second motors at respective speeds of RPM-1 and RPM-2. Moreover, it is the mechanical relationship between the two motors that results in the increased rotational speed of (RPM-1+RPM-2) at the output drive shaft 36. Thus, even though the motor 120 is energized to rotate RPM-2, which is less than the actual speed of rotor 124 (relative to "ground"), this does not slow down rotor 124, since the relative speed of rotor 124 with respect to already rotating stator 122 is in-fact maintained.

Figure 10:
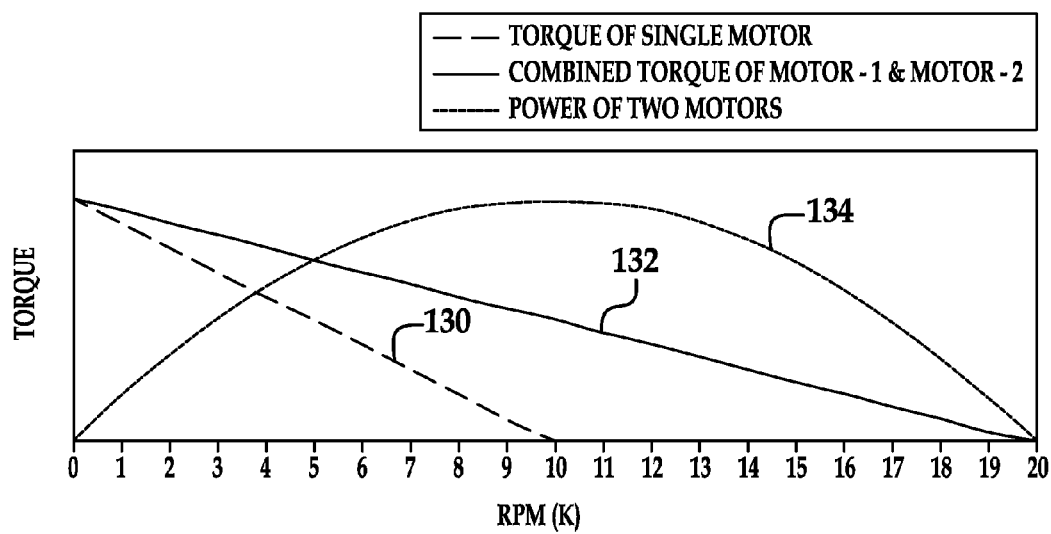
FIG. 10 is a torque and power versus speed chart reflecting the operation of the serial-coupled embodiment of FIG. 9.

FIG. 10 is a torque and power versus speed chart reflecting the operation of the serially-coupled motor embodiment of FIG. 9. Trace 130 shows the output torque of a single motor (e.g., motor 120), trace 132 shows the combined torque provided by two motors (e.g., motors 114, 120) and trace 134 shows the combined power output provided by two motors (e.g., motors 114, 120). FIG. 10 shows that the speed range over which a single motor can deliver torque is effectively doubled when two motors are put in a serially-coupled configuration (i.e., compare the trace 130, which extends across the range 0-10,000 RPM, with the trace 132, which extends across the range 0-20,000 RPM). However, also note that the peak torque is not increased or decreased because of the serial configuration (i.e., both trace 130 and trace 132 have their peaks at very low speed). The serially-coupled motor arrangement provides an equivalent output as compared to a single motor with double the amount of power and also coupled with a two-to-one gear ratio. The net result is that this serial configuration will have the same torque of a single motor and have double the maximum rotational speed range (RPM).

FIG. 10 also shows that the power peak is significantly higher than the power peak in FIG. 6. The difference is that, in the parallel configuration, Motor-1 stops contributing when its maximum rotational speed (RPM) has been exceeded. In the serially-coupled motor configuration, both motors contribute until the maximum rotational speed (RPM) for each motor is reached.

Figure 11:
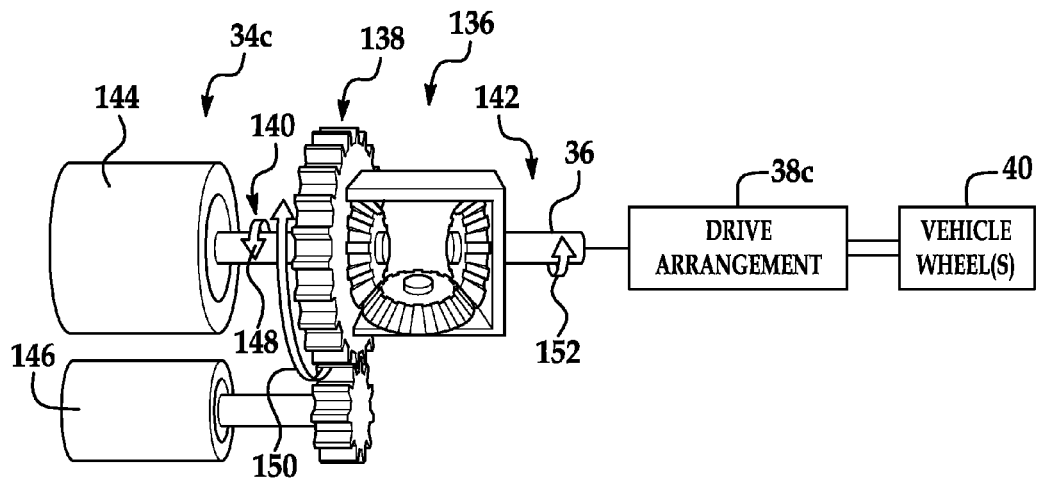
FIG. 11 is a diagrammatic and block diagram view of third, serial-coupled embodiment of the driveline of FIG. 1, including a differential gear.

FIG. 11 is a diagrammatic and block diagram view of a third, serially-coupled motor, embodiment of the electric motor arrangement, designated 34c, which includes a differential gear set 136. The arrangement 34c includes a differential gear set 136 comprising a main port 138 and first and second differential ports 140 and 142, a first electric motor 144, and a second electric motor 146. As with the other embodiments, an output drive shaft 36 is configured to be coupled to a drive arrangement 38c, which itself is configured to drive at least one wheel (vehicle wheels shown at 40).

As Background, in the conventional use of a differential gear set, the main port 138 would be coupled to a vehicle drive shaft, while first and second differential ports would be coupled to a pair of vehicle wheels, wherein the differential gear set is used to deliver power from the drive shaft to the wheels. Moreover, assuming a vehicle drive shaft rotates at a rotational speed ($R_d$) while delivering a torque ($T_d$), the conventionally-used differential gear set will deliver a wheel torque (T) equal to $T_d/2$ to each wheel, at a rotational speed of $R_d$. When one wheel (i.e., referred to as W1) is slowed down to a rotational speed (RPM) of ($R_d$−1), the other wheel (i.e., referred to as W2) will speed up its rotational speed (RPM) by a corresponding amount, to ($R_d$+1). However, if wheel W1 is stopped, causing its rotational speed to go to zero (i.e., in other words, slowed down by an amount equal to $R_d$, namely, $R_d-R_d=0$), the other wheel W2 will speed up by an amount corresponding to the amount by which W1 slowed down, i.e., by an amount equal to $R_d$ (i.e., speed is $2R_d=R_d+R_d$). Conversely, if one wheel (e.g., W1) is stopped and forced to turn backwards at a rotational speed (RPM) of $R_n$, then the rotational speed (RPM) of the other wheel W2 will be ($R_d+R_d+R_n$). The foregoing provides the background for further description of electric motor arrangement 34c using differential gear set 136.

Referring again to FIG. 11, one of the two motors (i.e., motor 146) is connected to the "drive shaft" input or main port 138, while the other one of the two motors (i.e., motor 144) is connected to one of the "wheel outputs" or differential port 140. Thus, the first motor 144 is mechanically coupled to impart a first rotational torque in a first rotational orientation (i.e., rotation in direction of arrow 148) at a first rotational speed (RPM-1) to the first differential port 140. Further, the second motor 146 is mechanically coupled to impart a second rotational torque in a second rotational orientation (i.e., rotation in direction of arrow 150) at a second rotational speed (RPM-2) to the main port 138.

In an embodiment, the control logic 30 is configured to control the first and second motors 144, 146 such that the second differential port 142 (which is coupled to output shaft 36) itself imparts a desired output torque, at a desired output rotational speed, in a desired rotational orientation (i.e., rotation in direction of arrow 152). In one embodiment, the control logic 30 is configured to energize motor 144 so as to force input differential port 140 to rotate in the direction of arrow 148, which is the opposite of the desired, output rotation in the direction of arrow 152 at output differential port 142. In this embodiment, shaft 36 will rotate at a rotational speed that is additive (i.e., the sum) of the two motors 144 and 146, namely, (RPM-1+RPM-2). This arrangement achieves the same result, in operation, as that described above for the serially-coupled motor embodiments.

This method of adding the rotational speed (RPM) from two motors is easier to implement mechanically. For example, both motors can be mounted to fixed platforms. Also this configuration will allow either of the motors to be locked, as described in greater detail below.

Variations are possible. For example, where the respective rotational orientations of the main port 138 and the first differential port 140 are opposite (e.g., CW versus CCW), then the rotational speed of the second differential port 142 will be additive of the two inputs.

In another implementation, one motor of a serial arrangement (which may take the form of that illustrated in FIG. 9 or some other serial arrangement) can be controlled by ECU/control logic 30 to a stall condition (i.e., to zero speed) and then a locking device (not shown) can be used to lock the shaft of the motor. For example, control logic 30 may be configured to energize the subject motor so as to progressively increase an oppositely directed torque until the motor rotor stops. Once the ECU/control logic 30 detects the stall condition, then the ECU/control logic 30 can engage a mechanical lock or the like to fix the rotatable portion (i.e., rotor/shaft) to the frame or the like to prevent subsequent rotation. Once mechanically locked, that motor can then be powered down until there is a need for that motor. When more power (i.e., torque) is required, both motors can be placed in the serially-coupled motor configuration using a differential gear set such as that described above. Again, if less power is required, a motor can be taken off-line. The control logic 30 can be configured to make the determination of when to take a motor off-line and when to bring an off-line motor back on-line, all based on the command or needed output torque, and what combination of motors and energization levels best meets the commanded or needed output torque.

In a still further implementation, the two motors 144, 146 connected to differential gear 136 may or may not be of the same power output or of the same type/design. The lock torque method can switch the motor to the load dynamically as load demand changes. The control logic 30 can be further configured to determine which one of the two motors, or both of them, should be energized and/or de-energized based not only the load conditions (i.e., needed torque), but also of the motor types, respective efficiencies, etc. For example, in an embodiment, assume the first and second electric motors 144, 146 have respective torque-versus-speed profiles, where each profile includes a respective efficiency defined at a plurality of operating points. The ECU/control logic 30 can be configured to select which one of the motors (or which one of the ports 138, 140) of the differential gear set to lock based on which one of the first and second motors has the higher efficiency, based on the efficiency profiles, for a desired output rotational speed and torque (operating point).

In another implementation, a manual speed change (gear change) is made possible by the lock torque feature of the invention. In particular, as described above, the control logic 30 can be configured to take one of the motors off-line dynamically, and lock the rotor and/or shaft thereof. When a motor is not powered on, it is relatively straightforward to change the gear associated with the off-line motor, which in turn affects the gear ratio between the motor and differential gear. Accordingly, in another embodiment, the hardware arrangement further includes a selectable/engageable plurality of gears associated with one or both of the motors. When the control logic 30 takes the motor off-line, a "manual" transmission gear shift can occur (without loss of fluid coupling).

In another implementation, a preferred gear for a future operational condition may be anticipated and the gear engaged with the off-line motor accordingly. Using two motors, when one is on-line, the second motor that is off-line can be configured to the anticipated gear to take over operation from the first motor and its associated gear.

The gear switch will not be in the critical path and the motor that is on-line drives the drive shaft of the vehicle while the off-line motor can be associated with the anticipated gear, powered up, and then co-power the load and ultimately take over with the new gear. The gear switch will contribute no time delay in power delivery. At all times, torque is being delivered to the shaft, albeit from one or both motors, without interruption.

In an exemplary embodiment, each motor is configured to drive a parallel gear shaft (not shown) that in turn drives the differential gear set. The parallel gear shaft may have one or more gears disposed thereon that engage both (1) the output of the motor (i.e., rotor/shaft) and (2) a gear on the drive shaft 36. In other words, the parallel gear shaft is in between the motor output and the output shaft. In one embodiment, the parallel gear shaft is configured to be moved to engage and disengage gears on the gear shaft and gears on the output shaft (rotor) of the motor. A linear motor (now shown), under the control of control logic 30, may be used to effect this movement, thereby achieving a gear change. The linear motor may be controlled by ECU 24/control logic 30 that also controls the operation of the motors (i.e., which motor is active, when is it active, and what is the output of the motor, for example). Accordingly, when a gear shift is desired, the appropriate motor can be locked up and taken off-line using, for example only, the lock torque technique described above, and the other motor will assume sole responsibility for driving the differential gear set and ultimately the output drive shaft 36. Once taken off-line, the gears can be switched and then the motor can be re-activated and may ramp up to speed to either take over driving of the output drive shaft 36 or at least contribute to it. Therefore, the shifting is seamless and smooth, and the drive shaft 36 is always, 100% of the time, driven so no down time or delay in the driving of the shaft—thereby improving efficiency and performance.

When a motor is used to deliver 10% or 20% of its rated output power level, the operation is not energy efficient. The efficiency can be as poor as 30%, versus an improved efficiency of 95% when the motor is running at a power level over about 60% of its designed load. In any of the embodiments described herein (i.e., those arranged serially or in parallel), operation using two motors can be used to improve efficiency, under a power and regenerate feature, described below.

More particularly, the control logic 30 can be configured to control the multiple motors in such a way that one motor provides power at a high power output level, such as at 100% output, where it is more efficient than at a lower level. The second motor can be operating in a regenerating mode such that it works as a generator, which presents as a load to the first motor. The second motor "generator" (electrical) output can be captured and stored in an energy storage mechanism, such as a rechargeable battery (not shown). If the second motor absorbs, for example, 90% of the mechanical output from the first motor, then 10% of the mechanical output of the first motor is delivered to the output drive shaft 36. Accordingly, while only 10% of the first motor's mechanical output is delivered to the drive shaft, it is still operating (producing) at 100% of its mechanical output. Accordingly, energy is not being wasted.

For example, at 100% of its rated mechanical output, the first motor has an efficiency of 95% (i.e., with respect to the conversion of electrical energy into a mechanical output-torque-note this means that 105.26% of electrical energy is needed to produce 100% of the rated output). The first motor thus has a loss of 5%. If the second motor, working as a generator, can generate electrical energy at 95% efficiency (i.e., with respect to the conversion of input mechanical energy-torque, into electrical energy), while absorbing 90% of the mechanical output from the first motor, then the second motor recovers about 81.23% of the electrical energy originally applied to the first motor. The overall efficiency for the energy recovery is 90.25% (i.e., 95%*95%=90.25%). By using this method, 19.76% of energy is used to deliver 10% of the output. The overall efficiency is therefore approximately 50.6% (i.e., 10%/19.76%=50.6%). The calculations in this example are set forth in Table 1 below.

TABLE 1

Motor/Generator Example 1

|  | % of Mechanical Output | Battery Electrical Input/Output | Motor 1 (use as motor) Mechancial Output | Motor 2 (use as generator) Electrical Output | % of Battery Energy |
|---|---|---|---|---|---|
| Efficiency |  |  | 95.00% | 95% |  |
| Operating at % of rated output | 100.00% | 105.26 | 100.00 |  |  |
| Output % to drive | 10.00% | 10.53 | 10.00 |  |  |
| Output % recaptured | 90.00% | 94.74 | 90.00 | 85.50 |  |
| Electricity From Motor 2 |  | −85.50 |  |  | −81.23% |
| Net energy consumed |  | 19.76 |  |  | 18.78% |
| Energy wasted |  | 9.76 |  |  | 9.28% |
| Overall efficiency |  | 50.60% |  |  |  |

In another example, if the first motor is operated at 70% output, the first motor has a loss of 3.5% (this is 96.5% efficiency). Stated another way, an electrical energy input of 72.54% of rated output will be required in this example. The second motor can load down the first motor by 60% to allow 10% of the rated output to the drive shaft. The second motor functions as a generator of 95% efficiency. The overall efficiency for the energy recovery is 91.68% (i.e., 96.5%*95%=91.68%). By using this method, 15.54% of energy is used to deliver 10% of the output. The overall efficiency is therefore approximately 64.35% (i.e., 10%/15.54%=64.35%). The calculations in this example are set forth in Table 2 below. This is an improved configuration to that previously described.

TABLE 2

Motor/Generator Example 2.

|  | % of Mechanical Output | Battery Electral Input/Output | Motor 1 (use as motor) Mechancial Output | Motor 2 (use as generator) Electrical Output | % of Battery Energy |
|---|---|---|---|---|---|
| Efficiency |  |  | 96.50% | 95% |  |
| Operating at % of rated output | 70.00% | 72.54 | 70.00 |  |  |
| Output % to drive | 10.00% | 10.36 | 10.00 |  |  |
| Output % recaptured | 60.00% | 62.18 | 60.00 | 57.00 |  |
| Electricity From Motor 2 |  | −57.00 |  |  | −55.01% |
| Net energy consumed |  | 15.54 |  |  | 21.42% |
| Energy wasted |  | 5.54 |  |  | 7.64% |
| Overall efficiency |  | 64.35% |  |  |  |

The control logic 30 can thus be configured to control the operation of the two motors in a power and regenerate arrangement to appropriately deliver the required power to the output drive shaft 36, while at the same time improving efficiency. It should be understood that the control logic 30 can be configured to not only determine a range of available energization schemes to meet the requested output torque/power, but to also overlay an efficiency analysis so as to select operating points (e.g., energization levels, such as 70%, 100%, etc.) that also improve efficiency, as described above.

Building upon the methods described above, different size motors (i.e., asymmetric motor configuration) can be used in the serially-coupled motor arrangement to optimize efficiency over speed (RPM) range and power output levels. A small output motor has better efficiency at relatively lower speed. In contrast, a large (output) motor is selected to mainly operate in relatively higher speed conditions and for acceleration. By optimizing the difference between two motor size and design characteristics, the efficiency level at any speed (RPM) and at any load level can be optimized.

For example, if a large motor is used for slow speed or cruising operation, only perhaps 15% of its rated mechanical output is used (e.g., typical cruising uses 20 to 30 horsepower, which is about 15% of a 150 horsepower motor). Such a motor is running at a very inefficient level. If a small motor is used for this type of operation, the motor can run at output levels of over 60% of its rated output, which operating point is in a much more energy efficient range (i.e., typical motor efficiency approaches optimum level when operating over 60% of its rated output).

Building on the principles of the parallel-coupled and serially-coupled configurations of the electric motor arrangement described above with respect to FIGS. 2, 9, and 11, other embodiments of the electric motor arrangement may allow for the conversion of a serially-coupled configuration into a parallel-coupled configuration. The conversion can occur under the programmed control of control logic 30. By reversing the steps, a parallel-coupled configuration can be converted to a serially-coupled configuration.

Figure 12:
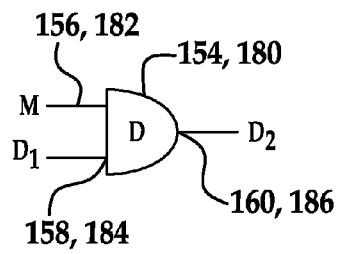
FIGS. 12 and 13 are diagrammatic views of a differential gear set and a parallel gear set, respectively.
Figure 13:
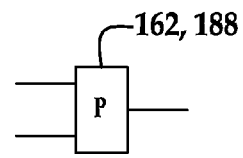

For example, FIGS. 14A-14E are schematic and block diagram views of an electric motor arrangement 34d. The electric motor arrangement 34d includes a differential gear set 154 (schematically illustrated in FIG. 12) comprising a main port 156 and first and second differential ports 158 and 160, a parallel gear set 162 (schematically illustrated in FIG. 13), a first electric motor (M$_1$) 164, a second electric motor (M$_2$) 166, and a third electric motor (M$_3$) 168. With respect to the differential gear set 154, the functionality and principles of operation thereof are the same as that of the differential gear set 136 described above. Accordingly, a detailed description of the functionality and operation of the differential gear set 154 will not be repeated here, rather the description of the differential gear set 136 set forth above is incorporated here by reference. Likewise, a detailed description of the parallel gear set 162 was described above and will not be repeated here, although it should be understood that each input in the parallel arrangement 162 may have a respective gear set and gear ratio associated therewith, just like described above. As with the other embodiments described above, output shaft 36 is configured to be coupled to a drive arrangement 38d, which itself is configured to drive at least one wheel (vehicle wheels shown at 40).

Figure 14A:
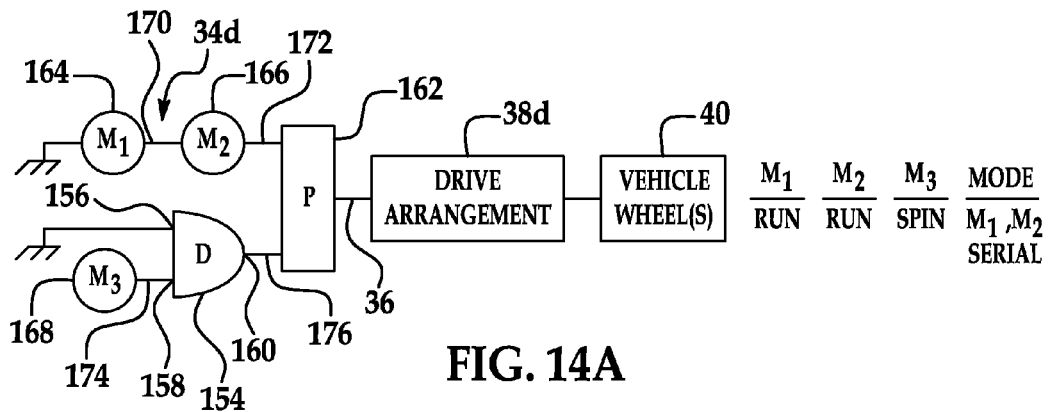

With reference to FIG. 14A, a first or initial state of the electric motor arrangement 34d is illustrated wherein the electric motor arrangement 34d is arranged in a serially-coupled configuration. In this state, the first motor 164 and the second motor 166 are serially-coupled together similar to that illustrated in FIG. 9. More particularly, the first and second motors 164, 166 each have stator and rotor portions. As illustrated in FIG. 14A, the stator portion of the first motor 164 is mechanically "grounded" (e.g., fixed to a vehicle frame or the like), while the rotor portion is mechanically coupled via a mechanical coupling member 170 to the stator portion of the second motor 166. The mechanical coupling member 170 may generally take the form of the mechanical coupling member 126 described above. However, as will be described in greater detail below, in an exemplary embodiment, the mechanical coupling member 170 is also configured to allow for a selective "break" between the first and second motors 164, 166, and therefore, the coupling member 170 may comprise at least in part, for example and without limitation, a clutch (e.g., electromagnetic clutch) or the like (not shown) adapted to provide this functionality. As will be described in greater detail below, in an exemplary embodiment, the coupling member 170 may comprise one or more clutches to selectively couple the first motor 164 to either the second motor 166 or the third motor 168, as well as to selectively couple the second motor 166 to either the first motor 164 or "ground". In any event, because the stator portion of the second motor 166 is coupled to the rotor of the first motor 164 in the arrangement illustrated in FIG. 14A, the stator portion of the second motor 166 will rotate at the same speed (RPM) as the rotor portion of the first motor 164. Additionally, the rotor portion of the second motor 166 will rotate at the combined speeds of the first and second motors 164, 166 (i.e., with respect to "ground") and is also mechanically coupled via the combination of an output shaft 172 and the parallel gear set 162 to the drive shaft 36.

With continued reference to FIG. 14A, the third motor 168 is mechanically coupled via an output shaft 174 thereof to the first differential port 158 of the differential gear set 154, while the main port 156 thereof is mechanically "grounded" (e.g., fixed to a vehicle frame or the like). The second differential port 160 of the differential gear set 154 is mechanically coupled via a coupling member 176 to the parallel gear set 162, which in turn develops an output torque on output drive shaft 36.

As briefly described above, in a first state, the combination of the first and second motors 164, 166 and the differential gear set 154 are both coupled to drive shaft 36 via the parallel gear set 162. More particularly, the output shaft 172 of the second motor 166 and the coupling member 176 coupled to the second differential port 160 of the differential gear set 154 are coupled to the drive shaft 36 through respective gear arrangements (and gear ratios) represented by the parallel gear set 162. In an exemplary embodiment, this is accomplished in substantially the same manner as that described above with respect to motors 42 and 44, and as illustrated in FIG. 2. Accordingly, the description above corresponding to coupling of the motors 42 and 44 to the drive shaft 36 is incorporated here by reference.

In an exemplary embodiment, the control logic 30 is configured to control the first, second, and third motors 164, 166, 168 arranged in the manner illustrated in FIG. 14A to cause the electric motor arrangement 34*d* to operate in a serially-coupled mode of operation. More particularly, the control logic 30 is configured to perform several functions: (1) energize or "run" the first and second motors 164, 166 (i.e., the first and second motors 164, 166 are "on-line") in the "serial" mode of operation, as described; and (2) de-energize the third motor 168, which configures the third motor 168 to spin freely (i.e., act as a flywheel) as a result of its mechanical connection to the parallel gear set 162 (i.e., the parallel gear set 162 is driven the serial combination of the first and second motors 164, 166—this causes the coupling member 176 to rotate therewith, which rotation is imparted to the second differential port 160 of differential gear set 154). Accordingly, when arranged as illustrated in FIG. 14A and controlled as described above, the electric motor arrangement 34*d* operates in substantially the same manner as the serially-coupled electric motor arrangement 34*b* illustrated in FIG. 9, notwithstanding the addition of the parallel gear set 162 in electric motor arrangement 34*d*. This is because the lower branch is inactive (i.e., flywheel).

In an instance where it is desired to switch the configuration of the electric motor arrangement 34*d* from a serially-coupled configuration to a parallel-coupled configuration, the control logic 30 is configured to implement such a conversion. More specifically, the control logic 30 is configured to control the components (i.e., the motors the coupling members (e.g., clutches, etc.) to perform the following steps to transform the arrangement 34*d* from a serially-coupled configuration (FIG. 14A) to a parallel-coupled configuration (FIG. 14E).

Figure 14B:
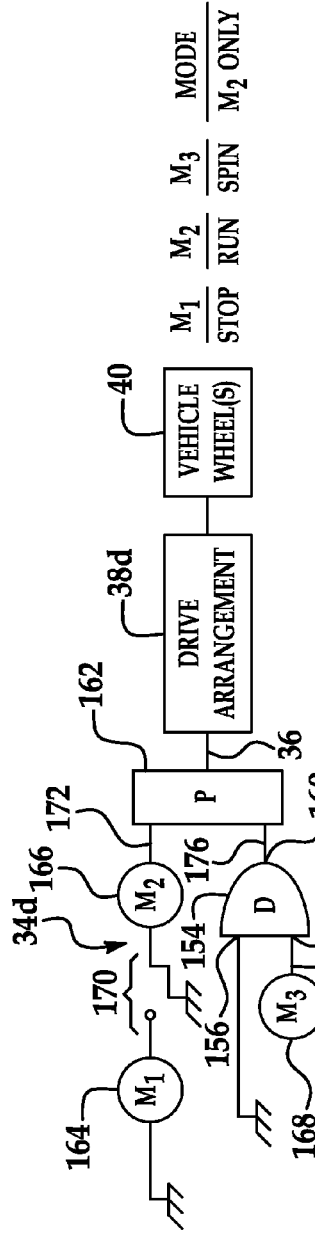

FIG. 14B represents a first of step of an exemplary methodology, and depicts a second state of the electric motor arrangement 34*d*. In this state, the second motor 166, and the output shaft 172 thereof, in particular, remains mechanically coupled to the drive shaft 36 via the parallel gear set 162. However, rather than the stator portion of the second motor 166 being mechanically coupled to the rotor portion of the first motor 164, in this state the stator portion of the second motor 166 is mechanically grounded (i.e., fixed to a vehicle frame or the like) just as the stator portion of the first motor 164 is also grounded. In order for the second motor 166 to switch from being coupled with the first motor 164 to being grounded, the coupling member 170 allows for the selective "break" between the two motors. As set forth above, this may be accomplished by including a clutch or other like component (not shown) in the coupling member 170 that operates under the control of, for example, the control logic 30. Because the first motor 164 is no longer coupled with the second motor 166, the first and second motors 164, 166 are now disengaged from each other. As illustrated in FIG. 14B, the configuration of the third motor 168 and the differential gear set 154 remains the same as it is in the first state above.

In this second state, the second motor 166 and the differential gear set 154 are both coupled to drive shaft 36 via the parallel gear set 162 in the same manner as was described above with respect to the first state illustrated in FIG. 14A.

The control logic 30 is configured to then control the first, second, and third motors 164, 166, 168 arranged in the manner illustrated in FIG. 14B to cause the electric motor arrangement 34*d* to operate in an intermediate mode of operation between a serially-coupled and a parallel-coupled mode of operation. More particularly, the control logic 30 is configured to (1) de-energize or "stop" the first motor 164 (i.e., take the first motor 164 "off-line"); (2) continue to energize the second motor 166; and (3) de-energize the third motor 168 so as to allow it to continue to spin freely (i.e., act as a flywheel) as a result of the rotation imparted onto the coupling member 176, as described above. Accordingly, when arranged as illustrated in FIG. 14B and controlled as described above, the electric motor arrangement 34*d* operates in a mode wherein only the second motor 166 is driving the drive shaft 36.

Figure 14C:
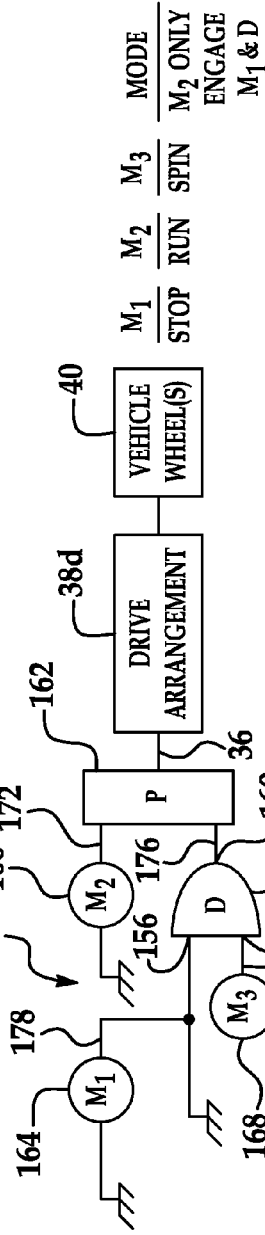

FIG. 14C represents a second step for converting the arrangement 34*d* to a parallel-coupled configuration, and depicts a third state of the electric motor arrangement 34*d*. In this state, the second motor 166, and the output shaft 172 thereof, in particular, remains mechanically coupled to the drive shaft 36 via the parallel gear set 162. Further, the stator portion of the second motor 166 remains mechanically grounded as it was in the second state illustrated in FIG. 14B. As was the case in both the first and second states described above (FIGS. 14A-14B), the stator portion of the first motor 164 remains mechanically grounded, however, the rotor portion, while remaining fixed, is configured to be engaged with the main port 156 of the differential gear set 154. The switching of the rotor portion of the first motor 164 to the main port 156 (i.e., from being de-coupled) may be accomplished with one or more clutches or other like components (not shown). As illustrated in FIG. 14C, the third motor 168 remains coupled with the first differential port 158 of the differential gear set 154, as it was in the first and second states described above.

In this third state, the second motor 166 and the differential gear set 154 are both coupled to drive shaft 36 via the parallel gear set 162 in the same manner as was described above with respect to the first state illustrated in FIG. 14A.

In an exemplary embodiment, the control logic 30 is configured to control the first, second, and third motors 164, 166, 168 arranged in the manner illustrated in FIG. 14C to cause the electric motor arrangement 34*d* to operate in another intermediate mode of operation to convert from a serially-coupled to a parallel-coupled mode of operation. More particularly, the control logic 30 is configured to (1) keep the first motor 164 de-energized or "stopped" (i.e., "off-line"); (2) to keep the second motor 166 energized or "running"; and (3) to permit the third motor 168 to continue to spin freely (i.e., act as a flywheel) as a result of the rotation imparted onto the coupling member 176 at the second differential port 160 by the rotation of the output shaft 172 of the second motor 166 through the parallel gear set 162. Accordingly, when arranged as illustrated in FIG. 14C and controlled as described above, the electric motor arrangement 34d operates in a mode wherein the first motor 164 is being engaged with the differential gear set 154 and the drive shaft 36 is once again driven solely by the second motor 166.

Figure 14D:
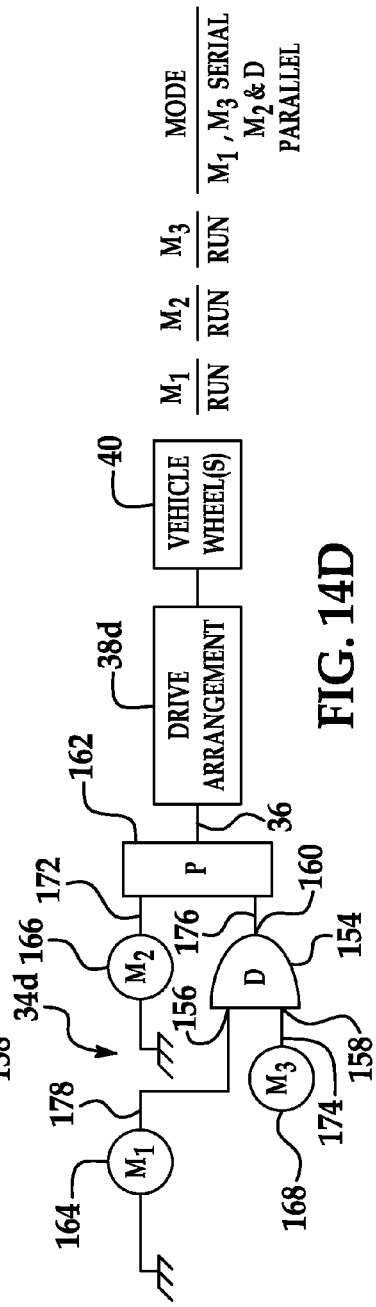

FIG. 14D represents a third step for converting the arrangement 34d to a parallel-coupled configuration, and depicts a fourth state of the electric motor arrangement 34d. In this state, the second and third motors 166, 168 are arranged or configured in the same manner as they were in the third state described above and illustrated in FIG. 14C. However, the first motor 164, and an output shaft 178 thereof, in particular, and the main port 156 of the differential gear set 154 are now mechanically coupled together as opposed to both being grounded or fixed.

In this fourth state (i.e., FIG. 14D), the second motor 166 and the differential gear set 154 are both coupled to drive shaft 36 via the parallel gear set 162 in the same manner as was described above with respect to the first state illustrated in FIG. 14A.

In an exemplary embodiment, the control logic 30 is configured to control the first, second, and third motors 164, 166, 168 arranged in the manner illustrated in FIG. 14D to cause the electric motor arrangement 34d to operate in yet another intermediate mode of operation between a serially-coupled and a parallel-coupled mode of operation. More particularly, the control logic 30 is configured to energize or "run" each of the first, second, and third motors 164, 166, 168 (i.e., all of the motors are "on-line"). Accordingly, when arranged as illustrated in FIG. 14D and controlled as described above, the electric motor arrangement 34d operates in a mode wherein the first and third motors 164, 168 are serially-coupled together and operate in substantially the same manner as the serially-coupled electric motor arrangement 34c illustrated in FIG. 11, the description of which is incorporated here by reference. Further, the second motor 166 (i.e., the output shaft 172 thereof) and the differential gear set 154 (i.e., the second differential port 160 thereof) are coupled together in a parallel configuration such that each is mechanically coupled to and drives the drive shaft 36 via the parallel gear set 162. This may be accomplished in substantially the same manner as the parallel-coupled electric motor arrangement 34a illustrated in FIG. 2, the description of which is also incorporated here by reference. Thus, in this state, the electric motor arrangement 34d operates in a dual serially-coupled (motors 164, 168) and parallel-coupled (motor 166 and the differential gear set 154) configuration wherein each of the motors 164, 166, 168 may drive the drive shaft 36.

FIG. 14E represents a fourth and final step for converting the arrangement 34d to a parallel-coupled configuration, and depicts a fifth state of the electric motor arrangement 34d. In this state, the second motor 166, and the output shaft 172 thereof, in particular, remains mechanically coupled to the drive shaft 36 via the parallel gear set 162. Further, the stator portion of the second motor 166 remains mechanically grounded as it was in various states described above. As was the case in each of the states described above, the stator portion of the first motor 164 also remains mechanically grounded in this state, while the rotor portion remains coupled via the output shaft 178 to the main port 156 of the differential gear set 154.

With continued reference to FIG. 14E, in this state, the third motor 168 is disengaged from the differential gear set 154. More particularly, the first differential port 158 of the differential gear set 154 is switched from being coupled with the rotor portion of the third motor 168 to being mechanically fixed or grounded. As described above with respect to switching relating to the first and second motors 164, 166 and the main port 156, the switching of the first differential port may be accomplished with a clutch or other like component (not shown) that operates under the control of the control logic 30, for example. Accordingly, in this state, the first motor 164 is coupled via the output shaft 178 thereof to the main port 156 of the differential gear set 154, and the first differential port 158 is mechanically "grounded". As with each of the states above, the second differential port 160 of the differential gear set 154 remains mechanically coupled, via the combination of the coupling member 176 and the parallel gear set 162, to the drive shaft 36.

In this fourth state, the second motor 166 and the differential gear set 154 are both coupled to drive shaft 36 via the parallel gear set 162 in the same manner as was described above with respect to the first state illustrated in FIG. 14A.

In an exemplary embodiment, the control logic 30 is configured to control the first, second, and third motors 164, 166, 168 arranged in the manner illustrated in FIG. 14E to cause the electric motor arrangement 34d to operate in a parallel-coupled mode of operation. More particularly, the control logic 30 is configured to keep the first and second motors 164, 166 energized or "running", and to de-energize or "stop" the third motor 168 (i.e., take the third motor 168 "off-line"). Accordingly, when arranged as illustrated in FIG. 14E and controlled as described above, the electric motor arrangement 34d operates in a mode wherein the first and second motors 164, 166 are coupled in a parallel configuration and operates in substantially the same manner as the parallel-coupled electric motor arrangement 34a illustrated in FIG. 2.

Accordingly, be performing the steps of the exemplary methodology set forth above and adjusting the mechanical and electrical (energization) configuration of the electric motor arrangement 34d accordingly, the electric motor arrangement 34d may be converted from a serially-coupled configuration to a parallel-coupled configuration. By reversing the steps, a parallel-coupled configuration can be converted to a serially-coupled configuration.

FIGS. 15A-15F are schematic and block diagram views of an electric motor arrangement 34e, which, like the electric motor arrangement 34d, is configured to be converted from a serially-coupled to a parallel-coupled configuration. In this embodiment, the electric motor arrangement 34e includes a pair of differential gear sets 180 (i.e., 180a and 180b) (schematically illustrated in FIG. 12), each comprising a main port 182 (i.e., 182a and 182b) and first and second differential ports 184 (i.e., 184a and 184b) and 186 (i.e., 186a and 186b). The electric motor arrangement 34e further includes a parallel gear set 188 (schematically illustrated in FIG. 13), a first electric motor ($M_1$) 190, a second electric motor ($M_2$) 192, and a third electric motor ($M_3$) 194. With respect to the differential gear sets 180a, 180b, the functionality and principles of operation thereof are the same as that of the differential gear set 136 described above. Accordingly, a description of the functionality and operation of the differential gear sets 180a, 180b will not be repeated here, rather the description of the differential gear set 136 set forth above is incorporated here by reference. Likewise, a description of a parallel gear set was set forth above and will not be repeated here with respect to parallel gear set 188. As with the other embodiments described above, output shaft 36 is configured to be coupled to a drive arrangement 38e, which itself is configured to drive at least one wheel (vehicle wheels shown at 40).

With reference to FIG. 15A, a first or initial state of the electric motor arrangement 34e is illustrated wherein the electric motor arrangement 34e is configured in a serially-coupled configuration. In this state, the first motor 190, and the rotor portion thereof, in particular, is mechanically coupled via a coupling member 196 to the main port 182a of the differential gear set 180a. The coupling member 196 may generally take the form of the coupling members 126, 170 described above, and in an exemplary embodiment is configured to allow for a selective "break" between the first motor 190 and the main port 182a of the differential gear set 180a. Accordingly, in an exemplary embodiment, the coupling member 196 may comprise, at least in part, for example and without limitation, a clutch (e.g., electromagnetically-controlled, such as by control logic 30, or the like—not shown) adapted to provide this functionality. As with the arrangement 34d above, the coupling member 196 may comprise one or more clutches to selectively couple the first motor 190 to the differential gear set 180a, to couple the first motor 190 and/or the main port 182a of the differential gear set 180a to ground (FIG. 15B), and/or to couple the first motor 190 to the main port 182b of the differential gear set 180b (FIG. 15E).

In this state, the second motor 192 is mechanically coupled via an output shaft 198 to the first differential port 184a of the differential gear set 180a. The second differential port 186a of the differential gear set 180a is mechanically coupled via the combination of a coupling member 200 and the parallel gear set 188 to the drive shaft 36. Accordingly, the first and second motors 190, 192 are coupled in a serial configuration and, notwithstanding the addition of the parallel gear set 188 in the electric motor arrangement 34e, operate in substantially the same manner as the serially-coupled electric motor arrangement 34c illustrated in FIG. 11, the description of which is incorporated here by reference.

With continued reference to FIG. 15A, in the initial state, the third motor 194 is mechanically coupled via an output shaft 202 thereof to the first differential port 184b of the differential gear set 180b, while the main port 182b thereof is mechanically "grounded" (e.g., fixed to a vehicle frame or the like). The second differential port 186b of the differential gear set 180b is mechanically coupled, via the combination of a coupling member 204 and the parallel gear set 188, to the drive shaft 36.

As briefly described above, in this first state, the differential gear sets 180a, 180b are both coupled to the drive shaft 36 via the parallel gear set 188. More particularly, the respective coupling members 200, 204 of the differential gear sets 180a, 180b are coupled to the drive shaft 36 through respective gear arrangements (and gear ratios) represented by the parallel gear set 188. In an exemplary embodiment, this is accomplished in substantially the same manner as that described above with respect to motors 42, 44, and as illustrated in FIG. 2. Accordingly, the description above corresponding to the coupling of the motors 42, 44 to the drive shaft 36 is incorporated here by reference.

In an exemplary embodiment, the control logic 30 is configured to control the first, second, and third motors 190, 192, 194 arranged in the manner illustrated in FIG. 15A to cause the electric motor arrangement 34e to operate in a serially-coupled mode of operation. More particularly, the control logic 30 is configured to (1) energize or "run" the first and second motors 190, 192 (i.e., the first and second motors are "on-line"); and (2) to de-energize the third motor 194, to permit the third motor 194 to spin freely (i.e., to act as a flywheel) as a result of the rotation imparted onto the coupling member 204 at the second differential port 186b by the rotation of the coupling member 200 through the parallel gear set 188. Accordingly, when arranged or configured as illustrated in FIG. 15A, and controlled as described above, the electric motor arrangement 34e operates in substantially the same manner as the serially-coupled electric motor arrangement 34c illustrated in FIG. 11, notwithstanding the addition of the parallel gear set 188 in electric motor arrangement 34e.

Figure 15F:
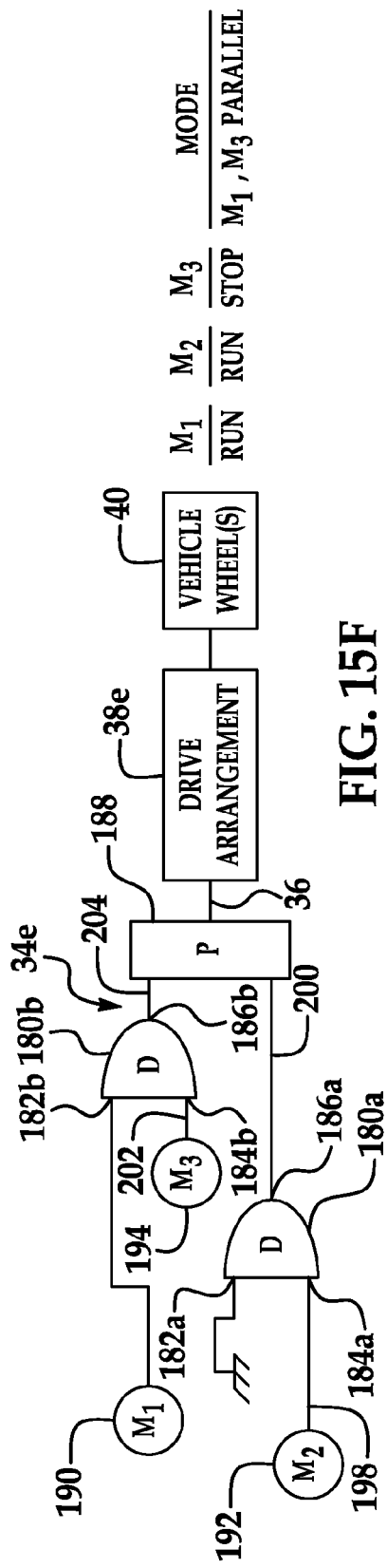

In an instance where it is desired to switch the configuration of the electric motor arrangement 34e from a serially-coupled configuration to a parallel-coupled configuration, the control logic 30 is configured to implement such a conversion. More specifically, the control logic 30 is configured to control the components (i.e., the motors, the coupling members, for example, one or more clutches, etc.) to perform the following steps to transform the arrangement 34e from a serially-coupled configuration (FIG. 15A) to a parallel-coupled configuration (FIG. 15F).

FIG. 15B represents a first step and depicts a second state of the electric motor arrangement 34e. In this state, the main port 182b of the differential gear set 180b remains fixed or grounded, and the third motor 194 remains mechanically coupled to the first differential port 184b of the differential gear set 180b. Similarly, the second motor 192 remains mechanically coupled to the first differential port 184a of the differential gear set 180a.

However, in this state, the first motor 190 is disengaged from the main port 182a of the differential gear set 180a, and the main port 182a is switched from being coupled with the rotor portion of the first motor 190 to being grounded or fixed. Accordingly, the coupling member 196 allows for the selective "break" between the first motor 190 and the differential gear set 180a, which, as set forth above, may be accomplished by including a clutch or other like component (not shown) in the coupling member 196 that operates under the control of, for example, the control logic 30. Because the first motor 190 is no longer coupled with the differential gear set 180a, the first and second motors 190, 192 are likewise no longer coupled together through the differential gear set 180a.

In this second state, the differential gear sets 180a, 180b are both coupled to the drive shaft 36 via the parallel gear 188 in the same manner as was described above with respect to the first state illustrated in FIG. 15A.

In an exemplary embodiment, the control logic 30 is configured to control the first, second, and third motors 190, 192, 194 arranged in the manner illustrated in FIG. 15B to cause the electric motor arrangement 34e to operate in an intermediate mode of operation between a serially-coupled and a parallel-coupled mode of operation. More particularly, the control logic 30 is configured to (1) de-energize or "stop" the first motor 190 (i.e., take the first motor "off-line"); (2) to keep the second motor 192 energized or "running"; and (3) to continue the third motor de-energized so as to allow the third motor 194 to continued to spin freely as it did in the first state. Accordingly, when arranged as illustrated in FIG. 15B and controlled as described above, the electric motor arrangement 34e operates in a mode wherein only the second motor 192 is driving the drive shaft 36 through the parallel gear set 188.

FIG. 15C represents a second step for converting the arrangement 34e to a parallel-coupled configuration, and depicts a third state of the electric motor arrangement 34e. In this state, the third motor 194 remains mechanically coupled to the first differential port 184b of the differential gear set 180b. Similarly, the second motor 192 remains mechanically coupled to the first differential port 184a of the differential gear set 180a. The first motor 190, and the rotor portion thereof, in particular, and the main port 182b of the differential gear set 180b remain grounded or fixed, however, the first motor 190 is configured for engagement with the main port 182b in this stage. As described above, the ultimate switching of both the rotor portion of the first motor 190 and the main port 182*a* from being grounded to being coupled with each other may be accomplished with one or more clutches or other like components (not shown).

In this third state, the differential gear sets 180*a*, 180*b* both remain coupled to the drive shaft 36 via the parallel gear 188 in the same manner as was described above with respect to the first state illustrated in FIG. 15A.

In an exemplary embodiment, the control logic 30 is configured to control the first, second, and third motors 190, 192, 194 arranged in the manner illustrated in FIG. 15C to cause the electric motor arrangement 34*e* to operate in another intermediate mode of operation between a serially-coupled and a parallel-coupled mode of operation. More particularly, the control logic 30 is configured to (1) keep the first motor 190 de-energized or "stopped" (i.e., "off-line"); (2) to keep the second motor 192 energized or "running"; and (3) to continue to de-energize the third motor 194 so as to permit the third motor 194 to continue to freely spin as it did in the first and second states. Accordingly, when arranged as illustrated in FIG. 15C and controlled as described above, the electric motor arrangement 34*e* operates in a mode wherein only the second motor 192 is driving the drive shaft 36 through the parallel gear set 188, but wherein the first motor 190 is being engaged with the differential gear set 180*b*.

FIG. 15D represents a third step for converting the arrangement 34*e* to a parallel-coupled configuration, and depicts a fourth state of the electric motor arrangement 34*e*. In this state, the first, second, and third motors 190, 192, 194 and the differential gear sets 180*a*, 180*b* are arranged or configured in the same manner as they were in the third state described above and illustrated in FIG. 15C, and the differential gear sets 180*a*, 180*b* both remain coupled to the drive shaft 36 via the parallel gear 188 in the same manner as was described above with respect to the first state illustrated in FIG. 15A. The difference between this state and the third state described above is in the control of the first, second, and third motors 190, 192, 194.

Accordingly, in an exemplary embodiment, the control logic 30 is configured to control the first, second, and third motors 190, 192, 194 arranged in the manner illustrated in FIG. 15D to cause the electric motor arrangement 34*e* to operate in yet another intermediate mode between a serially-coupled and a parallel-coupled mode of operation. More particularly, the control logic 30 is configured to stall and/or lock the first motor 190 to allow it to power up. This may be done in a manner described above or as otherwise known in the art. The control logic 30 is further configured to keep the second motor 192 energized or "running", and to also energize or "run" the third motor 194 (i.e., the second and third motors are "on-line"). Accordingly, when arranged as illustrated in FIG. 15D and controlled by control logic 30 as described above, the electric motor arrangement 34*e* operates in a mode wherein (1) the first and third motors 190, 194 are serially-coupled in the same manner as the electric motor arrangement 34*c* illustrated in FIG. 11, and (2) the second motor 192 is coupled (i.e., with the serial combination of the first and third motors 190, 194) in a parallel configuration in the same manner as the electric motor arrangement 34*a* illustrated in FIG. 2.

FIG. 15E represents a fourth step for converting the arrangement 34*e* to a parallel-coupled configuration, and depicts a fifth state of the electric motor arrangement 34*e*. In this state, the second and third motors 192, 194 are arranged or configured in the same manner as they were in the fourth state described above and illustrated in FIG. 15D. However, the first motor 190, and the rotor portion thereof, in particular, and the main port 182*b* of the differential gear set 180*b* are now mechanically coupled together.

In an exemplary embodiment, the control logic 30 is configured to control the first, second, and third motors 190, 192, 194 arranged in the manner illustrated in FIG. 15E to cause the electric motor arrangement 34*e* to operate in yet still another intermediate mode of operation between a serially-coupled and a parallel-coupled mode of operation. More particularly, the control logic 30 is configured to energize or "run" each of the first, second, and third motors 190, 192, 194 (i.e., all motors are "on-line"). Accordingly, when arranged as illustrated in FIG. 15E and controlled as described above, the electric motor arrangement 34*e* operates in a mode wherein the first and third motors 190, 194 are serially-coupled together in substantially the same manner as the serially-coupled electric motor arrangement 34*c* illustrated in FIG. 11. Further, the second motor 192, through the differential gear set 180*a*, and the serial combination of the first and third motors 190, 194, through the differential gear set 180*b*, are coupled together in a parallel configuration such that each is coupled to and drives the drive shaft 36 via the parallel gear set 188. This may be accomplished in substantially the same manner as the parallel-coupled electric motor arrangement 34*a* illustrated in FIG. 2. Thus, in this state, the electric motor arrangement 34*e* operates in a dual serially-coupled (motors 190, 194) and parallel-coupled (differential gears sets 180*a*, 180*b*) configurations wherein each of the motors 190, 192, 194 contribute to powering the drive shaft 36.

FIG. 15F represents a fifth and final step for converting the arrangement 34*e* to a parallel-coupled configuration, and depicts a sixth state of the electric motor arrangement 34*e*. In this state, the first and second motors 190, 192 are arranged or configured in the same manner as they were in the fifth state described above and illustrated in FIG. 15E. Further, the differential gear sets 180*a*, 180*b* both remain coupled to the drive shaft 36 via the parallel gear 188 in the same manner as was described above with respect to the first state illustrated in FIG. 15A. The third motor 194, and the rotor portion thereof, in particular, however, is disengaged from the differential gear set 180*b*. More particularly, the first differential port 184*b* of the differential gear set 180*b* is switched from being coupled with the rotor portion of the third motor 194 to being mechanically grounded or fixed, such that both the rotor portion of the third motor 194 and the first differential port 184*b* are grounded or fixed. As described above, this switching may be accomplished with a clutch or other like component (not shown) that operates under the control of the control logic 30, for example.

In an exemplary embodiment, the control logic 30 is configured to control the first, second, and third motors 190, 192, 194 arranged in the manner illustrated in FIG. 15F to cause the electric motor arrangement 34*e* to operate in a parallel-coupled mode of operation. More particularly, the control logic 30 is configured to keep the first and second motors 190, 192 energized or "running", and to de-energize or "stop" the third motor 194 (i.e., the third motor is taken "off-line"). Accordingly, when arranged as illustrated in FIG. 15F and controlled as described above, the electric motor arrangement 34*e* operates in a mode wherein the first motor 190 (through the differential gear set 180*b*) and the second motor 192 (through the differential gear set 180*a*) are coupled together in a parallel configuration such that each is coupled to and drives the drive shaft 36 via the parallel gear set 188. This may be accomplished in substantially the same manner as the parallel-coupled electric motor arrangement 34*a* illustrated in FIG. 2. Thus, in this state, the electric motor arrangement 34*e* operates in a parallel-coupled configuration wherein each of the first and second motors 190, 192 may drive the drive shaft 36 through the parallel gear set 188.

Accordingly, by performing the steps of the exemplary methodology set forth above and adjusting the mechanical and electrical configuration of the electric motor arrangement 34e accordingly, the electric motor arrangement 34e may be converted from a serially-coupled configuration to a parallel-coupled configuration.

Therefore, in view of the above, an additional feature enabled by the teachings of this disclosure is the ability to convert from a serially-coupled electric motor arrangement to a parallel-coupled electric motor arrangement by including, for example, a third electric motor and one (FIGS. 14A-14E) or more (FIGS. 15A-15F) differential gear sets. In addition, the torque and power delivery characteristics of the parallel and serially-coupled motor arrangements have been described above, as well as the corresponding efficiency considerations. It should be appreciated that control logic 30 can be configured with a plurality of operating or "shift" schedules that will determine when such a conversion is desirable and thus will occur. As described above, "shift" does not involve a transmission per se, but rather energizing electric motor(s), and/or de-energizing electric motor(s) and/or in this situation, further including the reconfiguration of the mechanical arrangement(s) as well. The trigger conditions monitored by control logic 30 may include, without limitation, user input (e.g., power demand indicated by depression of an accelerator pedal), vehicle speed, required torque, vehicle and electric motor operating conditions, available gear ratio(s) to switch into, and the like.

Another feature enabled by the teachings of the instant disclosure pertain to the elimination of differentials and/or transfer boxes in vehicles. If individual motors can be used to drive each wheel (either two-wheels or four-wheels depending on if 2-wheel or 4-wheel drive vehicle), then the differential (or transfer box) can be eliminated. In the past, one electric motor could not provide sufficient torque over the entire RPM range, and therefore, direct drive was impractical (i.e., the top speed is limited as there is not enough horsepower at high speed). To allow for high speed operation, then, each electric motor on each wheel would require its own transmission.

The multiple-motor configurations described herein (i.e., parallel or serial) eliminate the limitations noted above. Consequently, a direct drive configuration at each individual wheel becomes feasible. The benefit of the direct-drive configuration is that the differential (rear-end or similar transfer box) can be eliminated along with the weight of such components. The torque and rotational speed (RPM) of each wheel can be monitored and controlled electronically, by ECU 24/control logic 30. Functions such as anti-skip, anti-spin, traction control, and vehicle stability control, etc. can be more effectively implemented, again, via configuration of the control logic 30.

A still further feature enabled by the teachings herein pertains to dynamic braking power and energy recovery. As described above, the mechanical energy existing in the rotation of a rotor that is configured as a flywheel (non-driving) can be converted, through appropriate control by the control logic 30, into electrical energy, which in turn can be used to charge a battery or other energy storage mechanism. Reconfiguration in this manner, however, presents as a load to the driving motor(s), and thus can be used for dynamic, regenerative braking. Since the motors are hard-coupled together, it should be understood that not all of the motors need to be configured for the regenerative braking function. However, the added cost of implementing such a feature into one or more of the wheels, which adds to the total braking force, will result in a reduced amount of wear on the vehicle brake pads.

A still further feature enabled by the teachings herein involves use of recovered energy as a heating source for the vehicle HVAC system. For context, one of the direct results of eliminating the transmission in an electric vehicle is the elimination of a radiator/cooling system. This also eliminates one source of heat for the heating system. Despite this, two new sources are now available: (1) the heat removed from the operation of the electric motors may be captured and used for in-vehicle heating; and (2) the heat produced by the regenerative braking system can also be used as a heating source.

A still further feature enabled by the teachings herein involves the use of multiple-motor modules. Multiple motors can be built into the same housing, similar to a multi-core CPU within a single package. This packaging approach can facilitate integration into the design of the vehicle, whether the motors are in the parallel or the serial configuration.

A still further feature enabled by the teachings herein involves power on demand control and power management. Sensors can be used to monitor accelerator pedal travel (displacement) and the speed and acceleration of depression. The information can be used to interpret the intent of the driver of the vehicle. The control logic 30 can be configured to be responsive to such information indicative of driver intent to control the motors in one of a plurality of different operating modes (e.g., a performance operating mode, a fuel saving operating mode or a regular operating mode). In this regard, the control logic 30 can be configured to selectively activate and de-activate the one or more of the motor(s) to implement the driver's intent (i.e., demand in accordance with monitored pedal activity), which control will result in substantial power savings. In sum, the monitoring of the act of depressing the accelerator pedal (not just its actual position, e.g., 10%, 50%, 100%, or amount of travel, but also speed and acceleration of depression, etc.) can be used to controlling the motors.

Another feature enabled by the teachings herein, particularly the parallel-coupled motor configuration, involves anticipated spin up of the motors. When the vehicle accelerates or decelerates across a shifting point, the oncoming motor that will be taking over the load can be energized in advance. This advance spin-up will ensure smooth switch over and eliminate the time lapse in gear change. The result is a continuous transmission with no shifting delay. The control logic 30 can be configured with such methodology.

Yet another feature enabled by the teachings herein, particularly the parallel-coupled motor configuration, involves the ability to provide a separate drive arrangement for each individual axle(s). In one implementation, one or more motors may be configured to drive the front axle of the vehicle, and one or more other motors may be configured to drive the rear axle of the vehicle. Each motor (or set of motors) will have a different gear ratio for different speed ranges. For example, in low speed, the front wheels with the desired gear ratio will drive the vehicle; while in high speed, the rear wheels with the desired gear ratio will drive the vehicle. Additionally, as conditions change, such as road conditions, the vehicle can change from and between (1) front wheel drive; (2) rear wheel drive; and (3) all wheel drive. The foregoing methodology can be programmed into the control logic 30. In sum, different motors may be used to drive different axles, either one-at-a-time, or together.

Still another feature enabled by the teachings herein, particularly the parallel-coupled motor configuration, involves using electric motors with selective numbers of sectors in the rotor portions thereof. The rotor of an electric motor can itself have 2, 4, 6, or 8 sectors. All or some of the sectors may be electrically energized or powered. Different characteristics can be achieved by the different selections. This is analogous to a V8 engine running in 2, 4, or 6 cylinder mode. The control logic 30 can be configured to implement the sector configuration selection and implementation for each electric motor, based on desired performance.

A still further feature enabled by the teachings herein, particularly the parallel-coupled motor configuration, involves the capability of providing multiple motors on the same shaft. Multiple rotors and stators can be built on a solid shaft. The sectors of each can be placed with an off-set angle. For example, two rotors can be 90 degrees from each other. When one motor is turned "on", it will have four sectors. When the second motor is turned "on", it will be equivalent to having a single motor with eight sectors. This is a way to build an eight or 16 sector motor without being limited by the dimension of the rotor. This is identical to having two motors disposed in parallel, with respect to the solid shaft mentioned above. As with the other features, the control logic 30 can be configured to implement the needed methodology for coordinating energization of the separate, but related, stators/rotors.

A still further feature enabled by the teachings herein, particularly the parallel-coupled motor configuration, involves deploying a serially-coupled motor configuration as a single unit for one or more "motors" described above in the parallel-coupled motor configuration. This embodiment is particularly desirable when high-speed torque and power are desired.

In addition, as set forth above, the embodiments described herein are exemplary only and not limiting in nature. For example, multiple motor configurations, whether in the parallel or serial configuration, can be implemented with multiple motors of 2, 3, 4, and up to number n. The upper limit defining n will depend on the motor technology, and there may be practical limits on the maximum configuration of n. The approach may be likened to a CPU using multiple processing cores, which offer more performance and energy savings.

Still another feature enabled by the teachings herein, particularly the parallel-coupled motor configuration, involves optimized shifting point selection. The desired shifting point (switch points of RPM-1 and RPM-2 in connection with FIG. 4) can be optimized, taking into consideration the performance characteristics of Motor-1 and Motor-2. The switch points should be different during up shift versus down shift. The choices affect the overall efficiency, control system complexity, performance, etc. The control logic 30 can be configured to implement the particular, optimized up-shift and down-shift points.

A still further feature enabled by the teachings herein, particularly the parallel-coupled motor configuration, involves providing an electrical switching system. The parallel-coupled motor configuration is similar to an electrical transmission system. What is switched is the power source to the selected motor instead of switching the mechanical gear. The selected gear, in effect, depends on which motor is powered on, the desired torque and power that is delivered to the output drive shaft. It should be understood that control logic 30 can be configured to implement the switching of "gears", as described above.

In a still further feature enabled by the teachings herein, particularly the serially-coupled motor configuration, involves deployment of a concentric housing for the serially-coupled motor configuration. Two motors can be built into a single spherical enclosure with three co-centric shells. The outer two shells forms one motor (Motor-1) and the inner two shells forms a second motor (Motor-2). This is a space efficient method of housing multiple motors.

Embodiments of the present invention provide a large number of advantages. One advantage involves the capability of achieving a higher top speed in an electric vehicle without the use of speed change transmission. For example, assuming that a particular motor configuration can deliver sufficient torque for an electric car without a transmission (i.e., is hard-coupled to a wheel or other wheel drive arrangement) to enable a top speed of 100 MPH, then the two-motor configurations described herein can deliver sufficient power to drive the same vehicle to a top speed of over 150 MPH. Also, the torque and power delivered to the output drive shaft will be higher. The energy efficiency is also higher.

Another advantage involves the elimination of the speed change transmission. As described above, the transmission is typically expensive, heavy and often a weak point in terms of overall reliability for an electric vehicle. When a second motor is added to eliminate the transmission, the net positive effects are (1) efficiency improvements (i.e., transmission has significantly less than 100% efficiency, and in some estimates the transmission loss is 30%.); (2) a reduction in overall weight (i.e., the second motor is lighter than a transmission and its required cooling systems); (3) a reduction in the overall cost (i.e., the second motor is less expensive than a transmission); and (4) reliability improvements overall (i.e., the transmission generates heat and is contributes to significant failure mode in a vehicle, and in addition, the associated transmission cooling system is eliminated, which is itself a source of failure).

Other advantages, specific to the parallel-coupled motor configuration, includes (1) improved performance, in the RPM ranges in which both motors operate, particularly improved power and torque compared to a one motor configuration; (2) optimized performance, in particular, each motor can be optimized to function in a narrower RPM range, which can offer better optimized performance characteristics; and (3) physical improvements, in particular, the flywheel typically used in a vehicle can be reduced in size and weight, and in addition, the rotors of the motors, which are always turning, can sometimes perform dual purpose and function as flywheels.

Further advantages, specific to the serially-coupled motor configuration, include various benefits from the use of a transmission and serial motor architecture. In an embodiment, when a no loss, automatic, transmission is used, the most efficient part of a motor can be associated with a particular speed of a car. Coupled with the use of the serial architecture using two asymmetrical motors (i.e., motors of different size), the drive train can deliver power on demand and as well as power down part of the powertrain that is not needed. The advantages include: (1) the ability to use only a small motor to sustain cruising speed, improving efficiency as described above; (2) minimizing efficiency losses by avoiding the use of a large motor at the lower output levels of its capacity; (3) the ability to always operate the motors in an RPM range with most torque and power and best efficiency; and (4) improving reliability by eliminating the traditional automatic transmission, as well as improving efficiency by eliminating the loss associated with an automatic transmission.

It should be understood that an electronic controller or ECU as described above for certain embodiments may include conventional processing apparatus known in the art, capable of executing pre-programmed instructions stored in an associated memory, all performing in accordance with the functionality described herein. To the extent that the methods described herein are embodied in software, the resulting software may be stored in an associated memory and where so described, may also constitute the means for performing such methods. Implementation of certain embodiments of the invention, where done so in software, would require no more than routine application of programming skills by one of ordinary skill in the art, in view of the foregoing enabling description. Such an electronic controller or ECU may further be of the type having both ROM, RAM, a combination of non-volatile and volatile (modifiable) memory so that the software can be stored and yet allow storage and processing of dynamically produced data and/or signals.

What is claimed is:

1. A drive system for a vehicle, comprising:
    a differential gear set having a main port and first and second differential ports, said second differential port being configured to be mechanically coupled to a wheel of said vehicle;
    a first electric motor being mechanically coupled to impart a first rotational torque in a first rotational orientation at a first rotational speed to said first differential port;
    a second electric motor being mechanically coupled to impart a second rotational torque in a second rotational orientation at a second rotational speed to said main port;
    an electronic control unit (ECU) configured to control said first and second electric motors such that said second differential port of said differential gear set imparts a desired output torque at a desired output rotational speed.

2. The drive system of claim 1, wherein said ECU is configured to control said first and second motors so that said first and second rotational orientations are configured in a way wherein said output rotational speed is an additive function of said first and second rotational speeds.

3. The drive system of claim 2 wherein said ECU is configured to control said first and second motors such that said first rotational orientation is one of clockwise and counter-clockwise and said second rotational orientation is the other one said clockwise and counter-clockwise.

4. The drive system of claim 1 wherein said ECU is configured to control one of said first and second motors to a stall condition, said ECU being further configured to mechanically lock of said first port and said main port of said differential gear set corresponding to said motor in said stalled condition.

5. The drive system of claim 4 wherein said ECU is configured to determine when to effect said mechanical lock based on at least said desired output torque.

6. The drive system of claim 5 wherein said ECU is further configured to determine said desired output torque based at least in part on a load presented at said second differential port.

7. The drive system of claim 4 wherein said first and second electric motors have respective torque-versus-speed profiles wherein each profile includes a respective efficiency at a plurality of operating points, said ECU being further configured to select which one of said first port and said main port of said gear set to lock based on which one of said corresponding first and second motors has the higher efficiency, based on said profiles, for a desired output rotational speed and torque.

8. The drive system of claim 4, wherein at least one of said first and second motors are coupled to said first differential port and said main port via a speed change gear.

9. A drive system for a vehicle, comprising:
    first and second electric motors having respective first and second output shafts, said first and second output shafts being coupled to a drive shaft through gear arrangements having respective gear ratios associated therewith to thereby define a parallel motor architecture, said drive shaft being configured for connection to a drive arrangement for driving at least one wheel;
    an electronic control unit (ECU) and a computer-readable memory coupled thereto;
    control logic stored in said memory and configured to be executed by said ECU, said control logic being configured to control said first and second motors in accordance with a predetermined operating strategy, said strategy including first, second and third modes of operation, wherein in said first mode of operation said first motor is active and said second motor is inactive, in said second mode of operation said first and second motors are active, and in said third mode of operation, said first motor is inactive and said second motor is active.

10. The drive system of claim 9 wherein said drive shaft has a rotational speed associated therewith, and wherein said first mode corresponds to a first condition where said rotational speed is within a first speed interval, wherein said second mode corresponds to a second condition where said rotational speed is within a second speed interval, and wherein said third mode corresponds to a third condition where said rotational speed is within a third speed interval, wherein rotational speeds in said third interval being greater than rotational speeds in said second interval, and wherein rotational speeds in said second interval are greater than speeds in said first interval.

11. The drive system of claim 10 further including a third electric motor defining a redundant motor coupled to said drive shaft through a gear arrangement having third gear ratio associated therewith, said control logic being configured to control said redundant motor in accordance with said operating strategy, said strategy including activating said redundant motor in at least one of said first, second and third modes of operation.

12. The drive system of claim 11 wherein said redundant motor is configured to provide redundancy for one of said first and second electric motors.

13. The drive system of claim 12 wherein said redundant motor is activated when said one of said first and second electric motors is deactivated or is otherwise inoperable.

14. The drive system of claim 12 wherein said redundant motor and said one of said first and second motors are activated simultaneously.

15. The drive system of claim 11 wherein said redundant motor is configured to provide redundancy for both of said first and second electric motors.

16. The drive system of claim 15 wherein said redundant motor is activated when at least one of said first and second motors is deactivated or is otherwise inoperable.

17. The drive system of claim 15 wherein said strategy includes operating said redundant motor across a fourth speed interval that overlaps a plurality of said first, second and third speed intervals.

18. The drive system of claim 11 wherein said first and second motor comprise a first type of electric motor, said redundant motor being a second type of motor different from said first type in at least one characteristic including rated load handling level, continuous or intermittent load rating, efficiency, torque, power, and speed output.

19. The drive system of claim 18 wherein said first and second motors comprise an AC induction type of motor and said redundant motor comprises a DC type of motor.

20. A drive system for a vehicle, comprising:
a first electric motor having first stator and rotor portions;
a second electric motor having second stator and rotor portions;
wherein said second stator portion is coupled to said first rotor portion and said second rotor portion being coupled to a drive shaft configured for connection to a drive arrangement for driving at least one wheel;
an electronic control unit (ECU) and a computer-readable memory coupled thereto;
control logic stored in said memory and configured to be executed by said ECU, said control logic being configured to control said first and second motors in accordance with a predetermined operating strategy, said strategy including first, and second modes of operation, wherein in said first mode of operation, said second motor is active and said first motor is inactive, in said second mode of operation said first and second motors are active.

21. The drive system of claim 20 wherein said first rotor has a first rotational speed taken relative to said first stator, said second rotor has a second rotational speed taken relative to said second stator; when said first motor is active, said second rotor having composite rotational speed corresponding to the sum of said first and second rotational speeds when said first and second motors are active.

22. In a vehicle, a method of operating an electric motor arrangement configured to deliver power to an output drive shaft, comprising the steps of:
operating the electric motor arrangement in a first, serially-coupled motor configuration in accordance with a set of operating parameters; and
altering the first configuration to a second, parallel-coupled motor configuration when a change in one or more parameters in the set of operating parameters satisfy predetermined configuration-change criteria.

23. The method of claim 22 further including the step of:
altering the second configuration to the first configuration when a further change in one or more operating parameters satisfy predetermined configuration-change criteria.

* * * * *